United States Patent
Kanamarlapudi et al.

(10) Patent No.: US 12,238,036 B2
(45) Date of Patent: Feb. 25, 2025

(54) NEGATIVE ACKNOWLEDGMENT TRANSMISSIONS DURING PHYSICAL LAYER ISSUES

(71) Applicant: QUALCOMM Incorporated, San Diego, CA (US)

(72) Inventors: Sitaramanjaneyulu Kanamarlapudi, San Diego, CA (US); Ling Xie, Beijing (CN); Hobin Kim, San Diego, CA (US); Leena Zacharias, San Jose, CA (US); Wei Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/258,782

(22) PCT Filed: Feb. 11, 2021

(86) PCT No.: PCT/CN2021/076614
§ 371 (c)(1),
(2) Date: Jun. 21, 2023

(87) PCT Pub. No.: WO2022/170613
PCT Pub. Date: Aug. 18, 2022

(65) Prior Publication Data
US 2024/0048286 A1 Feb. 8, 2024

(51) Int. Cl.
*H04L 5/00* (2006.01)
*H04L 1/1829* (2023.01)
(52) U.S. Cl.
CPC .......... *H04L 5/0055* (2013.01); *H04L 1/1829* (2013.01)
(58) Field of Classification Search
CPC ................................................. H04L 5/0055
See application file for complete search history.

(56) References Cited

U.S. PATENT DOCUMENTS 7,895,494 B2 *  2/2011  Terry .................... H04L 1/1848
                                                                714/748
7,936,731 B2 *  5/2011  Park ...................... H04L 1/1819
                                                                370/215

(Continued)

FOREIGN PATENT DOCUMENTS

EP           2608605 A1    6/2013

OTHER PUBLICATIONS

International Search Report and Written Opinion—PCT/CN2021/076614—ISA/EPO—Jul. 21, 2021 (207832WO1).

*Primary Examiner* — Joseph D Torres
(74) *Attorney, Agent, or Firm* — Paul M. McAdams; Holland & Hart LLP

(57) ABSTRACT

Methods, systems, and devices for wireless communications are described. A user equipment (UE) determine that at least one packet of a set of packets for a downlink message is unsuccessfully received at a radio link control (RLC) layer of the UE due to a specific situation of a set of specific situations and may transmit the NACK message based on the missing packet (s) on an as needed basis rather than waiting for a timer to expire (e.g., a fast NACK mechanism). In some examples, the specific situations may include the UE missing packets after a measurement gap, missing packets based on wake up latencies for a discontinuous reception mode of the UE, missing packets due to interference from reference signals transmitted by neighboring cells, missing packets due to the UE not decoding retransmissions that have a same redundancy version (RV) of a downlink message, or a combination thereof.

18 Claims, 13 Drawing Sheets

(56) References Cited

U.S. PATENT DOCUMENTS

| | | | |
|---|---|---|---|
| 8,929,347 B2* | 1/2015 | Dalsgaard | H04W 72/12 370/328 |
| 9,270,409 B2* | 2/2016 | Earnshaw | H04L 1/0003 |
| 10,033,488 B2* | 7/2018 | Loehr | H04W 72/12 |
| 10,079,659 B2* | 9/2018 | Lin | H04L 1/1887 |
| 11,006,462 B2* | 5/2021 | Earnshaw | H04W 72/23 |
| 2008/0076427 A1* | 3/2008 | Huang | H04B 7/2628 455/450 |
| 2009/0168731 A1* | 7/2009 | Zhang | H04L 1/1854 370/336 |
| 2010/0034126 A1* | 2/2010 | Kitazoe | H04W 74/085 455/150.1 |
| 2010/0034158 A1* | 2/2010 | Meylan | H04W 24/10 370/252 |
| 2011/0205928 A1* | 8/2011 | Pelletier | H04W 52/0216 370/252 |
| 2015/0295692 A1 | 10/2015 | Gowda et al. | |
| 2016/0198352 A1 | 7/2016 | Jarrahi Khameneh et al. | |
| 2016/0255527 A1* | 9/2016 | Yang | H04W 24/10 455/452.1 |
| 2016/0269260 A1* | 9/2016 | Kazmi | H04L 1/20 |
| 2016/0302098 A1* | 10/2016 | Gheorghiu | H04W 56/001 |

* cited by examiner

NEGATIVE ACKNOWLEDGMENT TRANSMISSIONS DURING PHYSICAL LAYER ISSUES

CROSS REFERENCES

The present Application is a 371 national stage filing of International PCT Application No. PCT/CN2021/076614 by KANAMARLAPUDI et al. entitled "NEGATIVE ACKNOWLEDGMENT TRANSMISSIONS DURING PHYSICAL LAYER ISSUES," filed Feb. 11, 2021, which is assigned to the assignee hereof, and which is expressly incorporated by reference in its entirety herein.

FIELD OF TECHNOLOGY

The following relates to wireless communications, including negative acknowledgment (NACK) transmissions during physical (PHY) layer issues.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit a downlink message to a UE, and the UE may transmit acknowledgment feedback to the base station based on whether the UE successfully received the downlink message. If the UE unsuccessfully receives the downlink message (e.g., based on not fully receiving the downlink message, not fully decoding the downlink message, etc.), the UE may transmit a negative acknowledgment (NACK) feedback message to the base station. Upon receiving such a NACK feedback message, the base station may attempt to retransmit the downlink message to the UE. Techniques are desired for efficient transmission of NACK feedback messages.

SUMMARY

The described techniques relate to improved methods, systems, devices, and apparatuses that support negative acknowledgment (NACK) transmissions during physical (PHY) layer issues. Generally, the described techniques provide for a user equipment (UE) to transmit a NACK feedback message prior to a timer (e.g., a reassembly timer) expiring based on detecting one or more packets being lost due to specific situations. For example, the UE may determine that at least one packet of a set of packets for a downlink message is unsuccessfully received (e.g., missed) at a radio link control (RLC) layer of the UE and may transmit the NACK feedback message based on the missing packet(s) on an as needed basis rather than waiting for the timer to expire (e.g., such that the NACK feedback message may be referred to as or transmitted according to a "fast" NACK mechanism). In some examples, the specific situations in which the UE determines at least one packet is unsuccessfully received and then transmits the NACK feedback message prior to the timer expiring may include the UE missing packets after a measurement gap, missing packets based on connected discontinuous reception (C-DRX) wake up latencies, missing packets due to reference signals transmitted by neighboring cells interfering with the UE receiving downlink channels, missing packets due to the UE not decoding retransmissions from the base station when the base station sends a specific redundancy version (RV) of a downlink message, or a combination thereof.

A method for wireless communications at a UE is described. The method may include performing measurements of one or more wireless channels during a measurement gap, monitoring for a set of multiple packets for a downlink message following the measurement gap, determining that at least one packet of the set of multiple packets is unsuccessfully received at an RLC layer of the UE within a threshold amount of time following the measurement gap, and transmitting, to a base station via the RLC layer, a NACK message prior to an expiration of a reassembly timer based on the determining.

An apparatus for wireless communications at a UE is described. The apparatus may include a processor, memory coupled with the processor, and instructions stored in the memory. The instructions may be executable by the processor to cause the apparatus to perform measurements of one or more wireless channels during a measurement gap, monitor for a set of multiple packets for a downlink message following the measurement gap, determine that at least one packet of the set of multiple packets is unsuccessfully received at an RLC layer of the UE within a threshold amount of time following the measurement gap, and transmit, to a base station via the RLC layer, a NACK message prior to an expiration of a reassembly timer based on the determining.

Another apparatus for wireless communications at a UE is described. The apparatus may include means for performing measurements of one or more wireless channels during a measurement gap, means for monitoring for a set of multiple packets for a downlink message following the measurement gap, means for determining that at least one packet of the set of multiple packets is unsuccessfully received at an RLC layer of the UE within a threshold amount of time following the measurement gap, and means for transmitting, to a base station via the RLC layer, a NACK message prior to an expiration of a reassembly timer based on the determining.

A non-transitory computer-readable medium storing code for wireless communications at a UE is described. The code may include instructions executable by a processor to perform measurements of one or more wireless channels during a measurement gap, monitor for a set of multiple packets for a downlink message following the measurement gap, determine that at least one packet of the set of multiple packets is unsuccessfully received at an RLC layer of the UE within a threshold amount of time following the measurement gap, and transmit, to a base station via the RLC layer, a NACK message prior to an expiration of a reassembly timer based on the determining.

Some examples of the method, apparatuses, and non-transitory computer-readable medium described herein may further include operations, features, means, or instructions for receiving, from the base station, a configuration including an indication of the measurement gap, where the at least one packet is determined to be unsuccessfully received based on the configuration.

In some examples of the method, apparatuses, and non-transitory computer-readable medium described herein, the configuration may include network scheduling for at least the measurement gap, timing between the base station and the UE, or a combination thereof.

Some examples of the method, apparatuses, and non-transitory computer-readable medium described herein may further include operations, features, means, or instructions for determining to monitor for the set of multiple packets following the measurement gap, the monitoring for the set of multiple packets occurring after a delay duration based on the UE tuning back to a receiving state, where the at least one packet is determined to be unsuccessfully received based on the delay duration.

In some examples of the method, apparatuses, and non-transitory computer-readable medium described herein, determining that the at least one packet may be unsuccessfully received at the RLC layer may include operations, features, means, or instructions for determining that the at least one packet is unsuccessfully received at the RLC layer based on a wake up latency for a C-DRX mode of the UE.

Some examples of the method, apparatuses, and non-transitory computer-readable medium described herein may further include operations, features, means, or instructions for determining at least one hybrid automatic repeat request (HARQ) transmission fails including a transmission parameter, where the at least one packet is determined to be unsuccessfully received based on the at least one HARQ transmission including the transmission parameter failed.

In some examples of the method, apparatuses, and non-transitory computer-readable medium described herein, the transmission parameter may include a modulation and coding scheme (MCS).

In some examples of the method, apparatuses, and non-transitory computer-readable medium described herein, determining that the at least one packet may be unsuccessfully received at the RLC layer may include operations, features, means, or instructions for determining a reference signal transmission from a neighboring cell impacts reception of the at least one packet, where the NACK message is transmitted based on a block error rate (BLER) resulting from the reference signal transmission.

In some examples of the method, apparatuses, and non-transitory computer-readable medium described herein, the reference signal transmission may include a tracking reference signal (TRS) channel state information (CSI) reference signal (RS) or a non-zero power (NZP) CSI-RS.

In some examples of the method, apparatuses, and non-transitory computer-readable medium described herein, determining that the at least one packet may be unsuccessfully received at the RLC layer may include operations, features, means, or instructions for refraining from decoding a retransmission from the base station based on the base station transmitting the retransmission using an RV for the downlink message, where the at least one packet is unsuccessfully received based on the refraining from decoding the retransmission.

Some examples of the method, apparatuses, and non-transitory computer-readable medium described herein may further include operations, features, means, or instructions for receiving, from the base station, a retransmission of the at least one packet based on transmitting the NACK message.

DETAILED DESCRIPTION

In some wireless communications systems, when one or more packets (e.g., for a downlink message) are lost at a radio link control (RLC) layer of a user equipment (UE), the UE may start a reassembly timer and transmit an uplink control protocol data unit (PDU) requesting a base station to retransmit the lost packet(s) once the reassembly timer expires. However, the reassembly timer may have a duration of 50 to 100 milliseconds (ms), which may lead to long latency for the UE to receive the one or more packets. In some cases, packets may be lost due to UE specific design issues or implementation choices. As such, whenever a UE runs into such situations, the UE may lose some packets at the RLC level, and it may be beneficial to have a recovery mechanism to help reduced buffering at the RLC level.

As described herein, a UE may trigger a fast negative acknowledgment (NACK) mechanism at the RLC level based on different conditions if the UE detects missing packets at the RLC level or detects hybrid automatic repeat request (HARQ) failures. The fast NACK mechanism may entail the UE transmitting a NACK based on the missing packets on an as needed basis rather than waiting for a reassembly timer to expire. By using these techniques, the UE may have a quick opportunity to recover the lost packets, and thus, the techniques may provide quick delivery of the packets from the RLC layer to a packet data convergence protocol (PDCP) layer, which benefits a reduced round-trip time (RTT) and enhanced user experience.

The different conditions that the UE may identify for detecting missing packets may include the UE missing packets after a measurement gap (e.g., due to network implementations, such as scheduling, configuration issues, or UE and network timing, or due to UE implementations, such as delays in tuning back), missing packets based on connected discontinuous reception (C-DRX) wake up latencies (e.g., a HARQ transmission is lost such that transmission information, like a modulation and coding scheme (MCS), is missed resulting in the UE missing or discarding additional packets), missing packets due to reference signals transmitted by neighboring cells interfering with the UE receiving downlink channels, missing packets due to the UE not decoding retransmissions from the base station when the base station sends a specific redundancy version (RV) of a downlink message, or a combination thereof.

Aspects of the disclosure are initially described in the context of wireless communications systems. Additionally, aspects of the disclosure are illustrated through an additional wireless communications system and a process flow. Aspects of the disclosure are further illustrated by and described with reference to apparatus diagrams, system diagrams, and flowcharts that relate to NACK transmissions during PHY layer issues.

Figure 1:
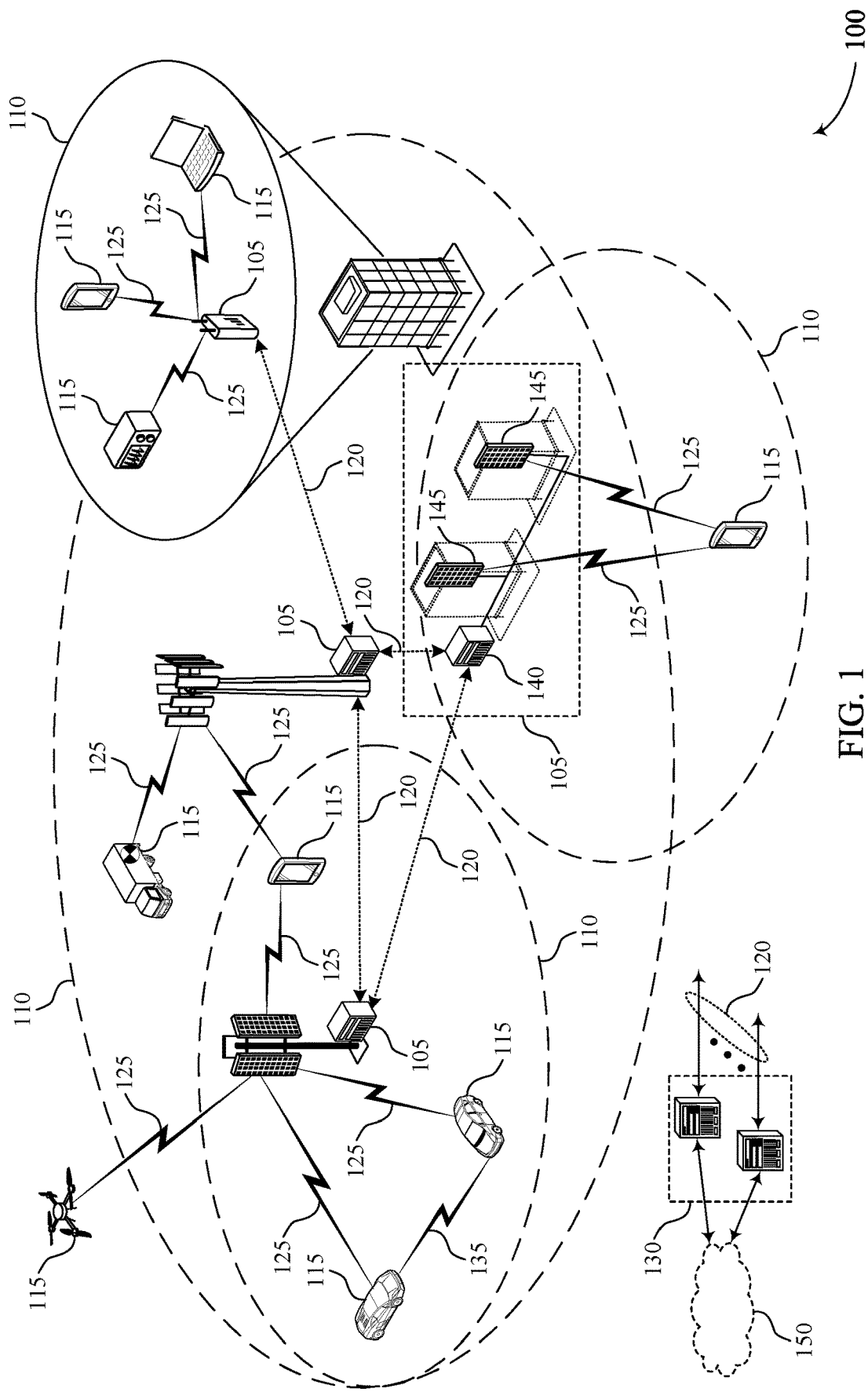
FIG. 1 illustrates an example of a wireless communications system that supports negative acknowledgment (NACK) transmissions during physical (PHY) layer issues in accordance with aspects of the present disclosure.

FIG. 1 illustrates an example of a wireless communications system 100 that supports NACK transmissions during PHY layer issues in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 ms). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lowerpowered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, HARQ feedback may include a UE 115 transmitting an acknowledgment feedback message to a base station 105 (e.g., or another device, such as an additional UE 115, a different network device, etc.) indicating whether a message (e.g., a downlink message) was successfully received (e.g., and decoded) or not. For example, the UE 115 may transmit a positive acknowledgment (ACK) message to the base station 105 indicating that the message was successfully received or may refrain from transmitting any feedback message when the message was successfully received. Additionally or alternatively, if the message is unsuccessfully received (e.g., and/or decoded), the UE 115 may transmit a NACK feedback message to the base station 105. If the base station 105 receives the NACK feedback message, the base station 105 may attempt to retransmit the message to the UE 115 or perform a different operation to ensure the UE 115 receives the message.

In some examples, a UE 115 may recover any PDUs lost at a MAC transport block level after HARQ retransmissions through an RLC automatic repeat request (ARQ) mechanism as part of an RLC acknowledgment mode (AM) operation. The RLC AM operation may include configuration parameters which control how an RLC AM control PDU is transmitted (e.g., how often, what information is included in the PDU, etc.). Using the RLC ARQ mechanism as part of the RLC AM operation, the RLC layer may initiate a reassembly timer (e.g., a T-reassembly timer) when a first packet is determined to be missed (e.g., unsuccessfully received) and may transmit an uplink control PDU requesting for retransmissions of at least the missing packet(s) (e.g., the requested retransmission may include the missed packets alone or may include the entire message including those missed packets) once the reassembly timer expires. In some examples, the reassembly timer may last a configured duration (e.g., in the order of 50 to 100 ms). Using the reassembly timer and waiting for the reassembly timer to expire prior to transmitting the uplink control PDU requesting a retransmission may help to overcome a logical delay due to HARQ retransmissions, HARQ scheduling, and round-trip delays between retransmissions.

When a UE 115 follows a NACK mechanism (e.g., transmitting at least a NACK feedback message if a message is unsuccessfully received) along with using the reassembly timer, the UE 115 may achieve an optimal radio resource management for most situations or scenarios based on network configurations. However, the NACK mechanism in conjunction with using the reassembly timer may not cover all possible scenarios, which can impact the user performance for the UE 115. For example, when one or more packets of a transmission are lost due to different scenarios and the UE 115 is buffering data for a long duration, waiting for the RLC level retransmissions may put a heavy burden on the UE 115 in terms of memory management (e.g., especially if peak rates are used for an initial transmission of the packets). As an example, the reassembly timer may be 50 ms, and an RTT may be 30 ms for the UE 115 transmitting the uplink control PDU requesting a retransmission of an initial transmission and then receiving the retransmission. As such, the UE 115 may buffer data from the initial transmission for at least 80 ms while waiting for the retransmission from the base station 105, thereby causing unnecessary burden on memory of the UE 115 and increasing latency for the UE 115 to successfully receive a message from the base station 105.

In some cases, a UE 115 may lose or unsuccessfully receive one or more packets of a downlink transmission from a base station 105 due to different situations, such as UE specific design issues or implementation choices. Accordingly, whenever the UE 115 runs into one of these different situations, the UE 115 may lose one or more packets at an RLC level. For example, these different situations may include missing packets after a measurement gap, missing packets based on C-DRX wake up latencies, missing packets due to reference signals transmitted by neighboring cells interfering with the UE 115 receiving downlink channels, missing packets due to the UE 115 not decoding retransmissions from the base station 105 when the base station 105 sends a specific RV of a downlink message, or a combination thereof. Techniques are desired for a recovery mechanism to help reduced buffering at the RLC level when the UE 115 determines one or more packets of the downlink transmission are missed based on one of the different situations.

Wireless communications systems 100 may support an RLC layer of a UE 115 triggering a fast NACK mechanism after a measurement gap configured for the UE 115 when one of the different situations described previously occurs where the RLC layer detects a missing packet or a HARQ failure. For example, the UE 115 may perform measurements of one or more channels during the measurement gap and then monitor for a set of packets for a downlink message from a base station 105 following the measurement gap. Subsequently, if the UE 115 determines at least one packet of the set of packets is missed (e.g., unsuccessfully received) at the RLC layer within a threshold amount of time after the measurement gap, the UE 115 may transmit a NACK feedback message to the base station 105 via the RLC layer prior to an expiration of a reassembly timer (e.g., the UE 115 transmits the NACK feedback message at its will upon detection of a missed packet rather than waiting for the reassembly timer before transmitting the NACK in an uplink control PDU). Using the fast NACK mechanism may support a quick opportunity for the UE 115 to recover missed packets and, thus, may provide quick delivery of the packets from the RLC layer to the PDCP layer of the UE 115, which may benefit a reduced RTT and enhanced user experience.

Figure 2:
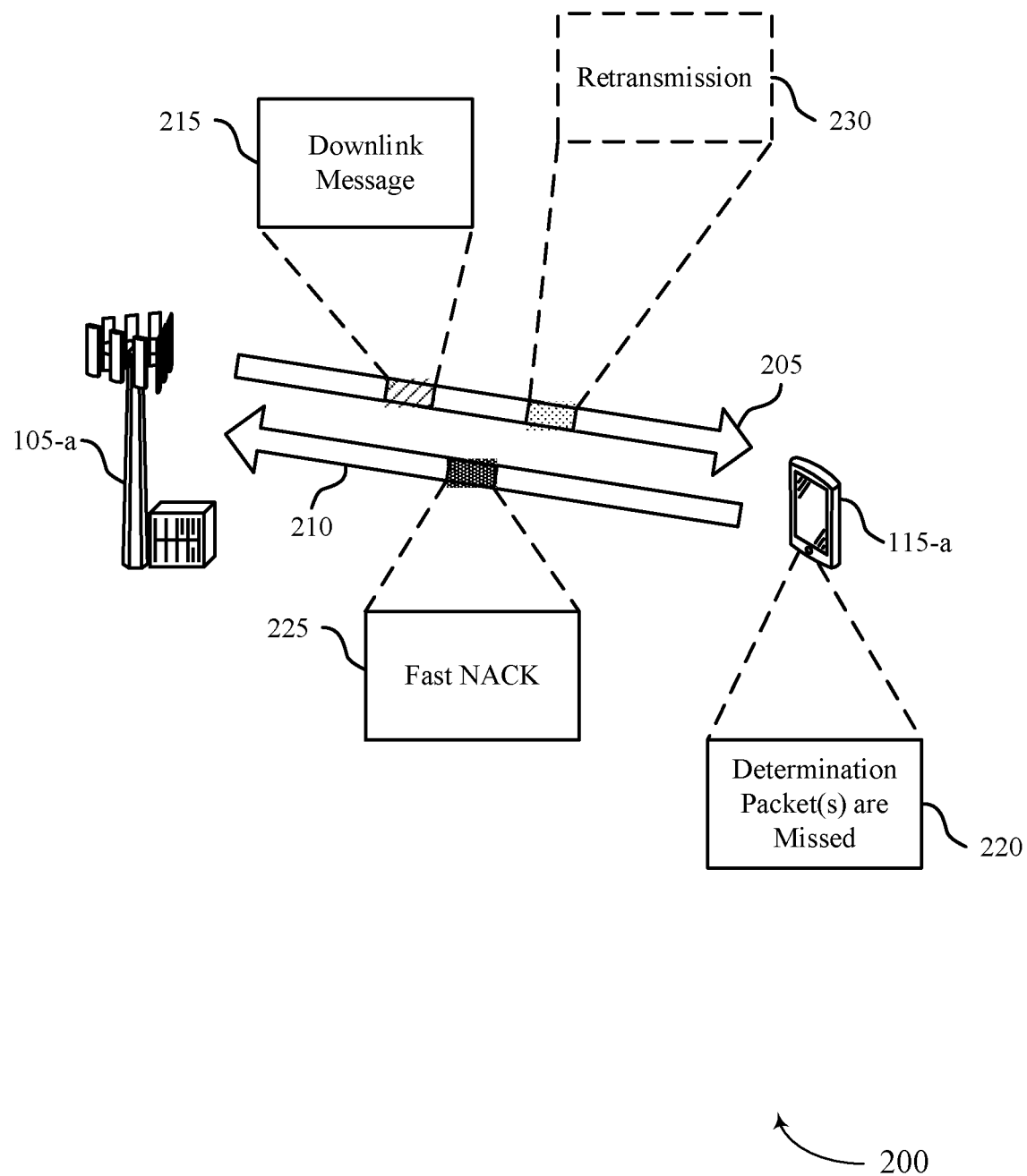
FIG. 2 illustrates an example of a wireless communications system that supports NACK transmissions during PHY layer issues in accordance with aspects of the present disclosure.

FIG. 2 illustrates an example of a wireless communications system 200 that supports NACK transmissions during PHY layer issues in accordance with aspects of the present disclosure. Wireless communications system 200 may implement aspects of or may be implemented by aspects of the wireless communications system 100. For example, wireless communications system 200 may include a base station 105-a and a UE 115-a, which may represent examples of base stations 105 and UEs 115, respectively, as described with reference to FIG. 1. Additionally, base station 105-a and UE 115-a may communicate on resources of a carrier 205 (for example, for downlink communications) and of a carrier 210 (for example, for uplink communications). Although shown as separate carriers, carrier 205 and carrier 210 may include same or different resources (for example, time and frequency resources) for the corresponding transmissions.

As described herein, base station 105-a may transmit a downlink message 215 to UE 115-a (e.g., via carrier 205), where downlink message 215 includes a number of packets. In some examples, UE 115-a may determine that one or more packets of the number of packets for downlink message 215 are missed at an RLC layer of UE 115-a via a determination 220. Additionally, UE 115-a may perform determination 220 to determine that the one or more packets of the number of packets for downlink message 215 are missed at the RLC layer within a threshold amount of time following the measurement gap. For example, the missed packet(s) may occur within a threshold amount of time once the measurement gap expires based on one of different situations that can occur for UE 115-a as described in greater detail in this example of FIG. 2.

Based on determination 220 that one or more packets are missed at UE 115-a, UE 115-a may transmit a fast NACK 225 via the RLC layer to base station 105-a (e.g., via carrier 210) indicating the one or more packets are missed. Fast NACK 225 may be different from other NACK transmissions or NACK feedback messages that UE 115-a transmits as part of an ARQ mechanism (e.g., HARQ-ACK feedback, RLC ARQ, etc.). For example, UE 115-a may transmit fast NACK 225 at its will upon detection of the one or more missed packets (e.g., 5-10 ms after the missed packet is detected), rather than waiting for a reassembly timer (e.g., T-reassembly timer) to expire (e.g., 50-100 ms) before sending a NACK transmission or NACK feedback message. Base station 105-a may then transmit a retransmission 230 to UE 115-a (e.g., via carrier 205) based on receiving fast NACK 225. By using fast NACK 225, UE 115-a and base station 105-a may reduce latency for UE 115-a receiving the full contents of downlink message 215 because UE 115-a does not wait for the duration of the reassembly timer to expire before sending a NACK, thereby reducing the time for UE 115-a to receive retransmission 230.

In some examples, UE 115-a may transmit fast NACK 225 when one or more packets are lost due to UE specific design issues or implementation choices. For example, when UE 115-a runs into one of different situations, UE 115-a may lose one or more packets at the RLC level, such that a recovery mechanism is desired to help reduced buffering at the RLC level (e.g., reduce how long UE 115-a buffers or stores successfully received information from downlink message 215 while waiting for retransmission 230). Accordingly, transmitting fast NACK 225 may reduce strains on the memory of UE 115-a by reducing how long UE 115-a buffers the information at the RLC level.

As described previously with reference to FIG. 1, the different situations for missing or losing packets at the RLC level may include missing packets after a measurement gap, missing packets based on C-DRX wake up latencies, missing packets due to reference signals transmitted by neighboring cells interfering with the UE 115 receiving downlink channels, missing packets due to UE 115-a not decoding retransmissions from base station 105-a when base station 105-a sends a specific RV of a downlink message, or a combination thereof. UE 115-a may determine that one of these different situations occur at determination 220 when determining that one or more packets of downlink message 215 are missed. Subsequently, UE 115-a may also determine to transmit fast NACK 225 based on missing one or more packets of downlink message 215 at the RLC layer due to one of these different situations.

For the situation where UE 115-a misses packets after a measurement gap, UE 115-a may detect that the one or more packets are lost from the RLC perspective after the measurement gap expires. For example, base station 105-a may configure UE 115-a with a measurement gap, where UE 115-a can perform measurements of different wireless channels (e.g., carrier 205, carrier 210, other channels, etc.) during the measurement gap. However, due to network implementations, such as issues with network scheduling of at least the measurement gap due to configuration issues or issues with an understanding of timing between UE 115-a and base station 105-a (e.g., the network), UE 115-a may lose the one or more packets of downlink message 215 at the RLC layer (e.g., RLC level) based on the measurement gap. Additionally or alternatively, UE 115-a may miss the one or more packets after the measurement gap based on UE implementation issues, such as a delay in UE 115-a tuning back to a receiving state after the measurement gap expires. Accordingly, UE 115-a may miss the one or more packets at the RLC layer based on a configuration of the measurement gap (e.g., network implementation issues), based on a delay of UE 115-a tuning back to a receiving state (e.g., UE implementation issues), or a combination thereof.

Additionally or alternatively, for the situation where UE 115-a misses packets based on C-DRX wake up latencies, UE 115-a may miss the one or more packets at the RLC level based on waking up from a sleep or inactive state associated with a C-DRX mode of UE 115-a. The C-DRX mode may include UE 115-a waking up intermittently or periodically to monitor for and receive messages from base station 105-a (e.g., such as downlink message 215) and entering an inactive state (e.g., or sleep state) when not monitoring for or receiving the messages. With C-DRX wake up latencies, few transmission decoding opportunities may be missed that result in packet drop. However, in some examples, a complete HARQ (e.g., HARQ transmission) may be lost (e.g., failed), or some first instances of HARQs (e.g., HARQ transmissions) may be lost (e.g., based on the wake up latency causing UE 115-a to miss HARQs at the beginning of the reception of downlink message 215). In such examples, these lost HARQs may include a transmission parameter that UE 115-a uses for receiving and decoding downlink message 215. For example, the lost HARQs may include an MCS, such that UE 115-a misses the MCS for receiving and decoding downlink message 215. Subsequently, even if UE 115-*a* decodes subsequent HARQs successfully after those lost HARQs, UE 115-*a* may completely discard the HARQ as the subsequent HARQs contain a reserved MCS based on the MCS included in the lost HARQs. Thus, UE 115-*a* may lose the one or more packets (e.g., at the RLC layer) based on HARQs lost due to the C-DRX wake up latencies.

Additionally or alternatively, for the situation where UE 115-*a* misses packets due to reference signals transmitted by neighboring cells interfering with the UE 115 receiving downlink channels, UE 115-*a* may miss the one or more packets at the RLC level based on a block error rate (BLER) due to the reference signal transmissions by the neighboring cells. For example, the reference signal transmissions may include a tracking reference signal (TRS) channel state information (CSI) reference signal (RS), a non-zero power (NZP) CSI-RS, or another type of reference signal. Based on configurations of the reference signal transmissions, the TRS or NZP CSI-RSs from neighbor cells may impact a decoding of a downlink shared channel (e.g., a physical downlink shared channel (PDSCH)) at UE 115-*a* in some slots. Accordingly, UE 115-*a* may miss the one or more packets at the RLC layer based on the reference signal transmissions from neighboring cells impacting reception of downlink message 215.

Additionally or alternatively, for the situation where UE 115-*a* misses packets due to UE 115-*a* not decoding retransmissions from base station 105-*a* when base station 105-*a* sends a specific RV of a downlink message, UE 115-*a* may refrain from decoding a retransmission if base station 105-*a* sends the retransmission using a first type of RV (e.g., RV0). The first type of RV (RV0) may indicate that a codeword (e.g., an encoded version of contents in downlink message 215) starts at a first bit (e.g., bit 0) of a codeblock in downlink message 215, whereas other RV types may indicate that the codeword starts at other locations of the codeblock (e.g., quarter mark of the codeblock, halfway mark of the codeblock, five-sixths mark of the codeblock, etc.). Once bits of a codeword reach an end of the codeblock for the other RV types than the first type of RV, the bits may wrap around to the first bit (e.g., bit 0) of the codeblock (e.g., circle around based on a circular buffer).

In some cases, initial transmissions may be transmitted according to the first type of RV (RV0). Additionally, retransmissions may also be transmitted according to the first type of RV. However, when retransmission are transmitted according to the first type of RV, UE 115-*a* may refrain from decoding the retransmission as chase combining is worse than incremental redundancy (IR). Chase combining may include a first type of soft combining that a device can use as part of HARQ mechanism, where every retransmission contain same information and the device combines received bits with same bits from previous transmissions. Additionally or alternatively, IR may include a second type of soft combining that a device can use as part of HARQ mechanism, where every retransmission contains different information from a previous transmission or retransmission, such as different RVs and different sets of coded bits than previous transmissions.

That is, using IR, coded bits may start at different locations within each retransmission, enabling the device to gain extra information with each retransmission if same issues are causing the device to miss a same portion of the transmissions and retransmissions. As such, if base station 105-*a* keeps using a same RV (e.g., first type of RV (RV0)) for retransmissions of downlink message 215, UE 115-*a* may use chase combining as opposed to IR because the retransmissions contain the same information in the same locations as previous transmissions. However, as indicated previously, chase combining may not be as effective as IR (e.g., chase combining is worse than IR), so UE 115-*a* may refrain from decoding retransmissions that use the same RV. Accordingly, by refraining from decoding retransmissions that use the same RV, UE 115-*a* may experience a worse HARQ recovery that can result in a HARQ BLER, which may lead to UE 115-*a* missing the one or more packets of downlink message 215 or of retransmission 230.

Upon detection of missing at least one packet of downlink message 215 due to one of these situations (e.g., if the RLC layer of UE 115-*a* detects the missing packet(s) or HARQ failures), the RLC layer of UE 115-*a* may trigger the fast NACK mechanism post-measurement gap to transmit fast NACK 225 to base station 105-*a* (e.g., without waiting for a reassembly timer to expire). The fast NACK mechanism may enable a quick opportunity for UE 115-*a* to recover the missed packets (e.g., unsuccessfully received packets) and, thus, may provide quick delivery of the packets (e.g., contents) of downlink message 215 from the RLC layer to a PDCP layer of UE 115-*a*, which benefits a reduced RTT and enhanced user experience. For example, conditionally transmitting fast NACK 225 from the RLC layer (e.g., fast RLC NACK) based on measurement gap-specific packet loss (e.g., packets missed post-measurement gap) to recover the lost packets fast may help to reduce an overall RTT both at an over-the-air (OTA) level as well as at a user experience level, enhancing scheduling as well as application quality.

Figure 3:
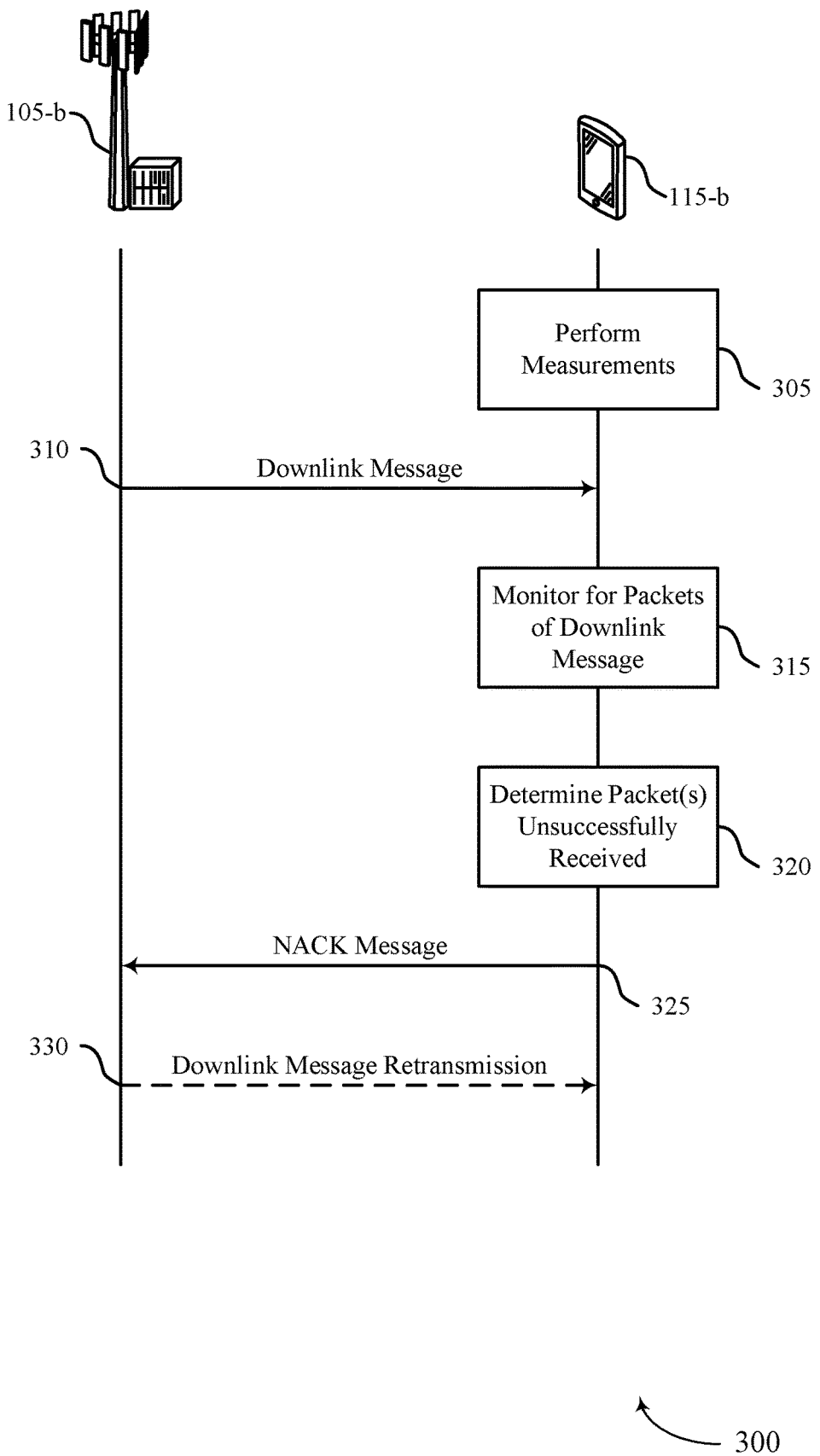
FIG. 3 illustrates an example of a process flow that supports NACK transmissions during PHY layer issues in accordance with aspects of the present disclosure.

FIG. 3 illustrates an example of a process flow 300 that supports NACK transmissions during PHY layer issues in accordance with aspects of the present disclosure. Process flow 300 may implement aspects of or may be implemented by aspects of wireless communications systems 100 or 200 or both. For example, process flow 300 may include a base station 105-*b* and a UE 115-*b*, which may represent examples of base stations 105 and UEs 115, respectively, as described with reference to FIGS. 1 and 2.

In the following description of process flow 300, the operations between UE 115-*b* and base station 105-*b* may be performed in different orders or at different times. Operations may also be left out of process flow 300, or other operations may be added to process flow 300. It is to be understood that although UE 115-*b* and base station 105-*b* are shown performing a number of the operations of process flow 300, any wireless device may perform the operations shown.

At 305, UE 115-*b* may perform measurements of one or more wireless channels during a measurement gap. In some example, UE 115-*b* may receive, from base station 105-*b*, a configuration that includes an indication of the measurement gap.

At 310, base station 105-*b* may transmit, to UE 115-*b*, a downlink message. In some example, the downlink message may include a set of packets.

At 315, UE 115-*b* may monitor for the set of packets for the downlink message following the measurement gap. In some example, UE 115-*b* may determine to monitor for the set of packets following the measurement gap after a delay duration that is based on UE 115-*b* tuning back to a receiving state.

At 320, UE 115-*b* may determine that at least one packet of the set of packets is unsuccessfully received at an RLC layer of UE 115-*b* within a threshold amount of time following the measurement gap. In some examples, the UE 115-*b* may determine the at least one packet is unsuccessfully received based on the configuration that includes the indication of the measurement gap. For example, the configuration that includes the indication of the measurement gap may include network scheduling for at least the measurement gap, timing between base station 105-*b* and UE 115-*b*, or a combination thereof. Additionally or alternatively, UE 115-*b* may determine the at least one packet is unsuccessfully received based on the delay duration for the UE 115-*b* tuning back to the receiving state.

In some examples, UE 115-*b* may determine that the at least one packet is unsuccessfully received at the RLC layer based on a wake up latency for a C-DRX mode of UE 115-*b*. For example, UE 115-*b* may determine at least one HARQ transmission fails that includes a transmission parameter, where the at least one packet is determined to be unsuccessfully received based on the at least one HARQ transmission that includes the transmission parameter failing. In some examples, the transmission parameter may include an MCS.

Additionally or alternatively, UE 115-*b* may determine a reference signal transmission from a neighboring cell impacts reception of the at least one packet such that the at least one packet is determined to be unsuccessfully received based on the impact from the reference signal transmission from the neighboring cell. In some examples, the UE 115-*b* may determine to transmit a NACK message to base station 105-*b* for the at least one packet based on a BLER resulting from the reference signal transmission. The reference signal transmission may include a TRS CSI-RS or an NZP CSI-RS.

In some examples, UE 115-*b* may refrain from decoding a retransmission from base station 105-*b* based on base station 105-*b* transmitting the retransmission using an RV for the downlink message (e.g., RV0), where the at least one packet is determined to be unsuccessfully received based on the refraining from decoding the retransmission.

At 325, UE 115-*b* may transmit, to base station 105-*b* via the RLC layer, a NACK message prior to an expiration of a reassembly timer based on the determining that at least one packet is unsuccessfully received at the RLC layer of UE 115-*b*. For example, UE 115-*b* may transmit the NACK message according to a fast NACK mechanism as described with reference to FIG. 2, where the NACK message is transmitted at the will of UE 115-*b* (e.g., 5 ms, 10 ms, etc., after the at least one packet is determined to be missing) rather than waiting for the reassembly timer to expire before transmitting the NACK message.

At 330, UE 115-*b* may receive, from base station 105-*b*, a retransmission of the at least one packet based on transmitting the NACK message.

Figure 4:
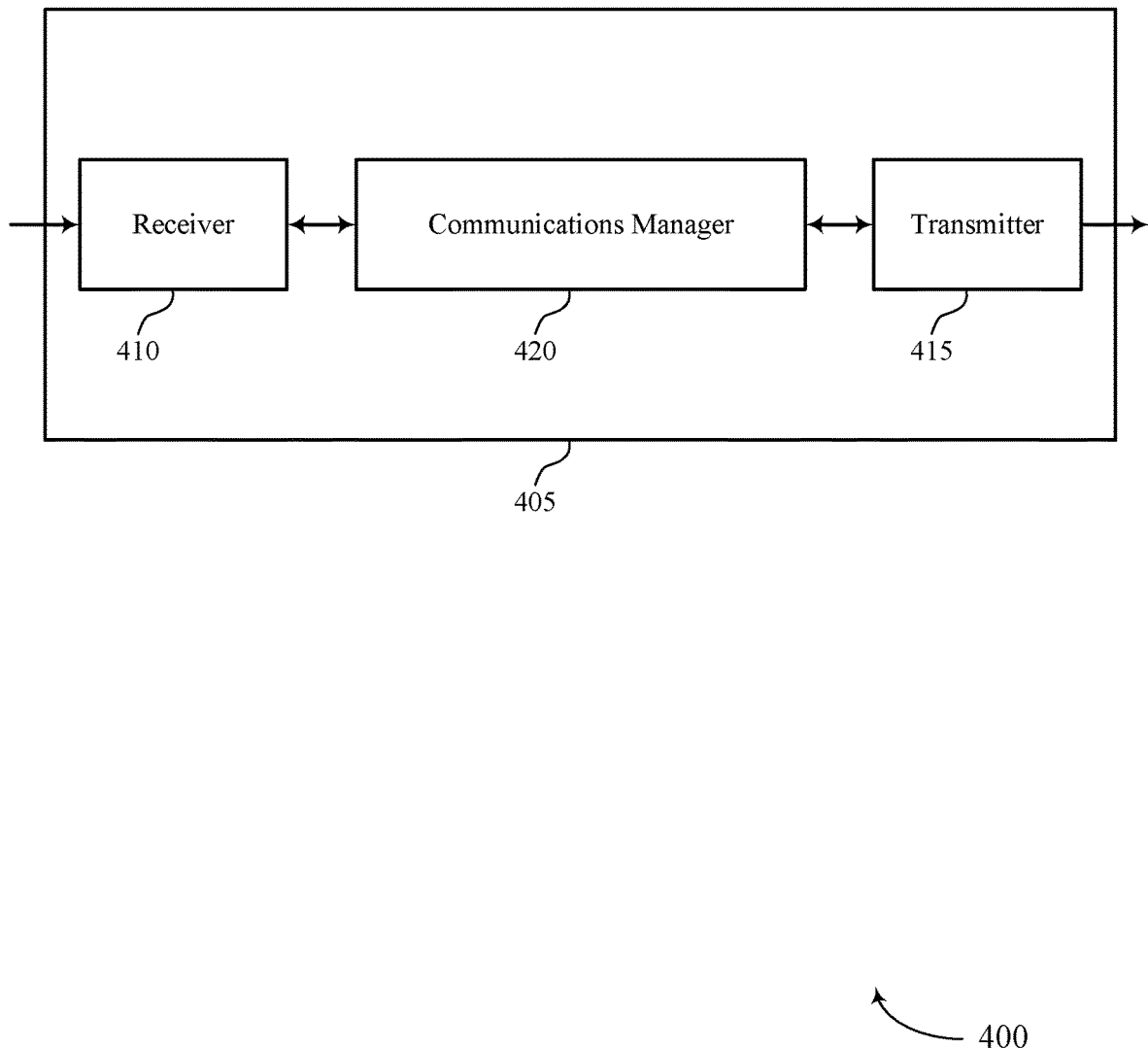
FIGS. 4 and 5 show block diagrams of devices that support NACK transmissions during PHY layer issues in accordance with aspects of the present disclosure.

FIG. 4 shows a block diagram 400 of a device 405 that supports NACK transmissions during PHY layer issues in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, or control information associated with various information channels (e.g., control channels, data channels, information related to NACK transmissions during PHY layer issues). Information may be passed on to other components of the device 405. The receiver 410 may utilize a single antenna or a set of multiple antennas.

The transmitter 415 may provide a means for transmitting signals generated by other components of the device 405. In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of NACK transmissions during PHY layer issues as described herein. For example, the communications manager 420, the receiver 410, the transmitter 415, or various combinations thereof or various components thereof may support a method for performing one or more of the functions described herein.

In some examples, the communications manager 420, the receiver 410, the transmitter 415, or various combinations thereof or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations thereof or components thereof, may be implemented in code (e.g., as communications management software or firmware) executed by a processor. If implemented in code executed by a processor, the functions of the communications manager 420, the receiver 410, the transmitter 415, or various combinations thereof or components thereof, may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for performing measurements of one or more wireless channels during a measurement gap. The communications manager 420 may be configured as or otherwise support a means for monitoring for a set of multiple packets for a downlink message following the measurement gap. The communications manager 420 may be configured as or otherwise support a means for determining that at least one packet of the set of multiple packets is unsuccessfully received at an RLC layer of the UE within a threshold amount of time following the measurement gap. The communications manager 420 may be configured as or otherwise support a means for transmitting, to a base station via the RLC layer, a NACK message prior to an expiration of a reassembly timer based on the determining.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced latency. For example, based on transmitting a NACK message prior to an expiration of a reassembly timer when a packet of a downlink message is determined to be unsuccessfully received at an RLC layer of the device 705, the device 705 may request a retransmission (e.g., via the NACK message) at will rather than waiting for the reassembly timer to expire to transmit the NACK message, thereby reducing latency for the device 705 to receive the full downlink message.

Figure 5:
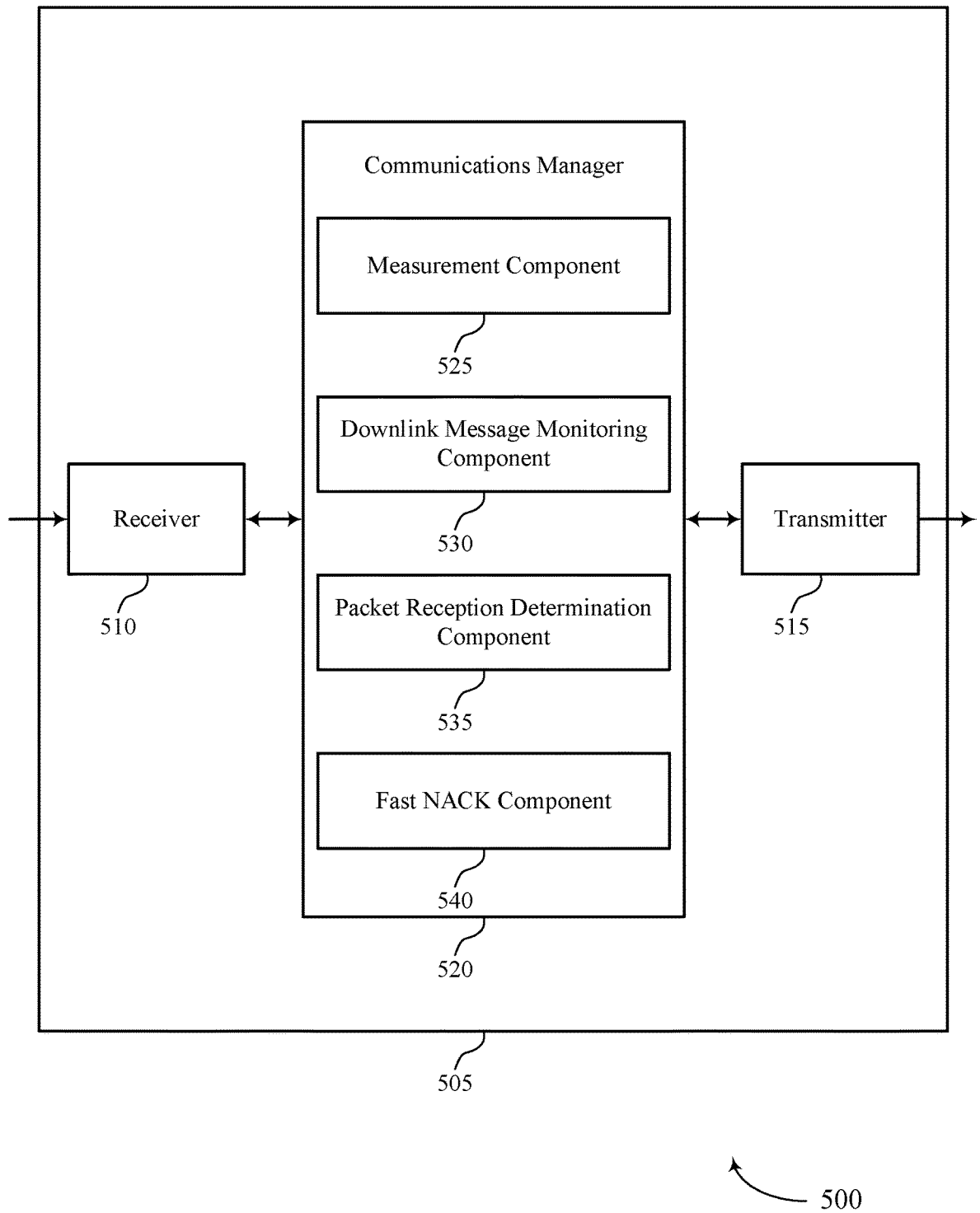

FIG. 5 shows a block diagram 500 of a device 505 that supports NACK transmissions during PHY layer issues in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to NACK transmissions during PHY layer issues). Information may be passed on to other components of the device 505. The receiver 510 may utilize a single antenna or a set of multiple antennas.

The transmitter 515 may provide a means for transmitting signals generated by other components of the device 505. In some examples, the transmitter 515 may be co-located with a receiver 510 in a transceiver module. The transmitter 515 may utilize a single antenna or a set of multiple antennas.

The device 505, or various components thereof, may be an example of means for performing various aspects of NACK transmissions during PHY layer issues as described herein. For example, the communications manager 520 may include a measurement component 525, a downlink message monitoring component 530, a packet reception determination component 535, a fast NACK component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The measurement component 525 may be configured as or otherwise support a means for performing measurements of one or more wireless channels during a measurement gap. The downlink message monitoring component 530 may be configured as or otherwise support a means for monitoring for a set of multiple packets for a downlink message following the measurement gap. The packet reception determination component 535 may be configured as or otherwise support a means for determining that at least one packet of the set of multiple packets is unsuccessfully received at an RLC layer of the UE within a threshold amount of time following the measurement gap. The fast NACK component 540 may be configured as or otherwise support a means for transmitting, to a base station via the RLC layer, a NACK message prior to an expiration of a reassembly timer based on the determining.

Figure 6:
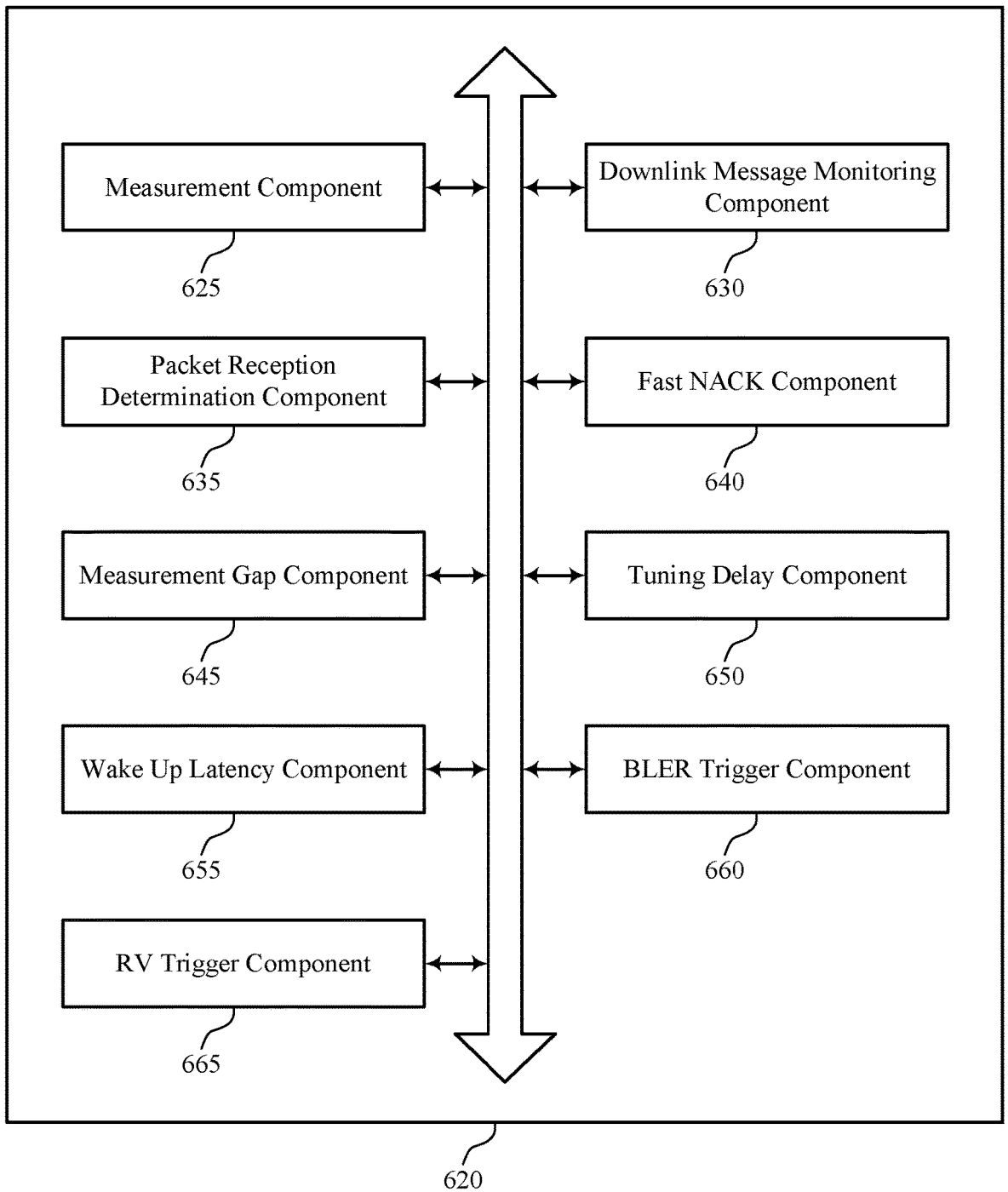
FIG. 6 shows a block diagram of a communications manager that supports NACK transmissions during PHY layer issues in accordance with aspects of the present disclosure.

FIG. 6 shows a block diagram 600 of a communications manager 620 that supports NACK transmissions during PHY layer issues in accordance with aspects of the present disclosure. The communications manager 620 may be an example of aspects of a communications manager 420, a communications manager 520, or both, as described herein. The communications manager 620, or various components thereof, may be an example of means for performing various aspects of NACK transmissions during PHY layer issues as described herein. For example, the communications manager 620 may include a measurement component 625, a downlink message monitoring component 630, a packet reception determination component 635, a fast NACK component 640, a measurement gap component 645, a tuning delay component 650, a wake up latency component 655, a BLER trigger component 660, an RV trigger component 665, or any combination thereof. Each of these components may communicate, directly or indirectly, with one another (e.g., via one or more buses).

The communications manager 620 may support wireless communications at a UE in accordance with examples as disclosed herein. The measurement component 625 may be configured as or otherwise support a means for performing measurements of one or more wireless channels during a measurement gap. The downlink message monitoring component 630 may be configured as or otherwise support a means for monitoring for a set of multiple packets for a downlink message following the measurement gap. The packet reception determination component 635 may be configured as or otherwise support a means for determining that at least one packet of the set of multiple packets is unsuccessfully received at an RLC layer of the UE within a threshold amount of time following the measurement gap. The fast NACK component 640 may be configured as or otherwise support a means for transmitting, to a base station via the RLC layer, a NACK message prior to an expiration of a reassembly timer based on the determining.

In some examples, the measurement gap component 645 may be configured as or otherwise support a means for receiving, from the base station, a configuration including an indication of the measurement gap, where the at least one packet is determined to be unsuccessfully received based on the configuration. In some examples, the configuration may include network scheduling for at least the measurement gap, timing between the base station and the UE, or a combination thereof.

In some examples, the tuning delay component 650 may be configured as or otherwise support a means for determining to monitor for the set of multiple packets following the measurement gap, the monitoring for the set of multiple packets occurring after a delay duration based on the UE tuning back to a receiving state, where the at least one packet is determined to be unsuccessfully received based on the delay duration.

In some examples, to support determining that the at least one packet is unsuccessfully received at the RLC layer, the wake up latency component 655 may be configured as or otherwise support a means for determining that the at least one packet is unsuccessfully received at the RLC layer based on a wake up latency for a C-DRX mode of the UE.

In some examples, the wake up latency component 655 may be configured as or otherwise support a means for determining at least one HARQ transmission fails including a transmission parameter, where the at least one packet is determined to be unsuccessfully received based on the at least one HARQ transmission including the transmission parameter failed. In some examples, the transmission parameter may include an MCS.

In some examples, to support determining that the at least one packet is unsuccessfully received at the RLC layer, the BLER trigger component 660 may be configured as or otherwise support a means for determining a reference signal transmission from a neighboring cell impacts reception of the at least one packet, where the NACK message is transmitted based on a BLER resulting from the reference signal transmission. In some examples, the reference signal transmission may include a TRS CSI-RS or an NZP CSI-RS.

In some examples, to support determining that the at least one packet is unsuccessfully received at the RLC layer, the RV trigger component 665 may be configured as or otherwise support a means for refraining from decoding a retransmission from the base station based on the base station transmitting the retransmission using an RV for the downlink message, where the at least one packet is unsuccessfully received based on the refraining from decoding the retransmission.

In some examples, the fast NACK component 640 may be configured as or otherwise support a means for receiving, from the base station, a retransmission of the at least one packet based on transmitting the NACK message.

Figure 7:
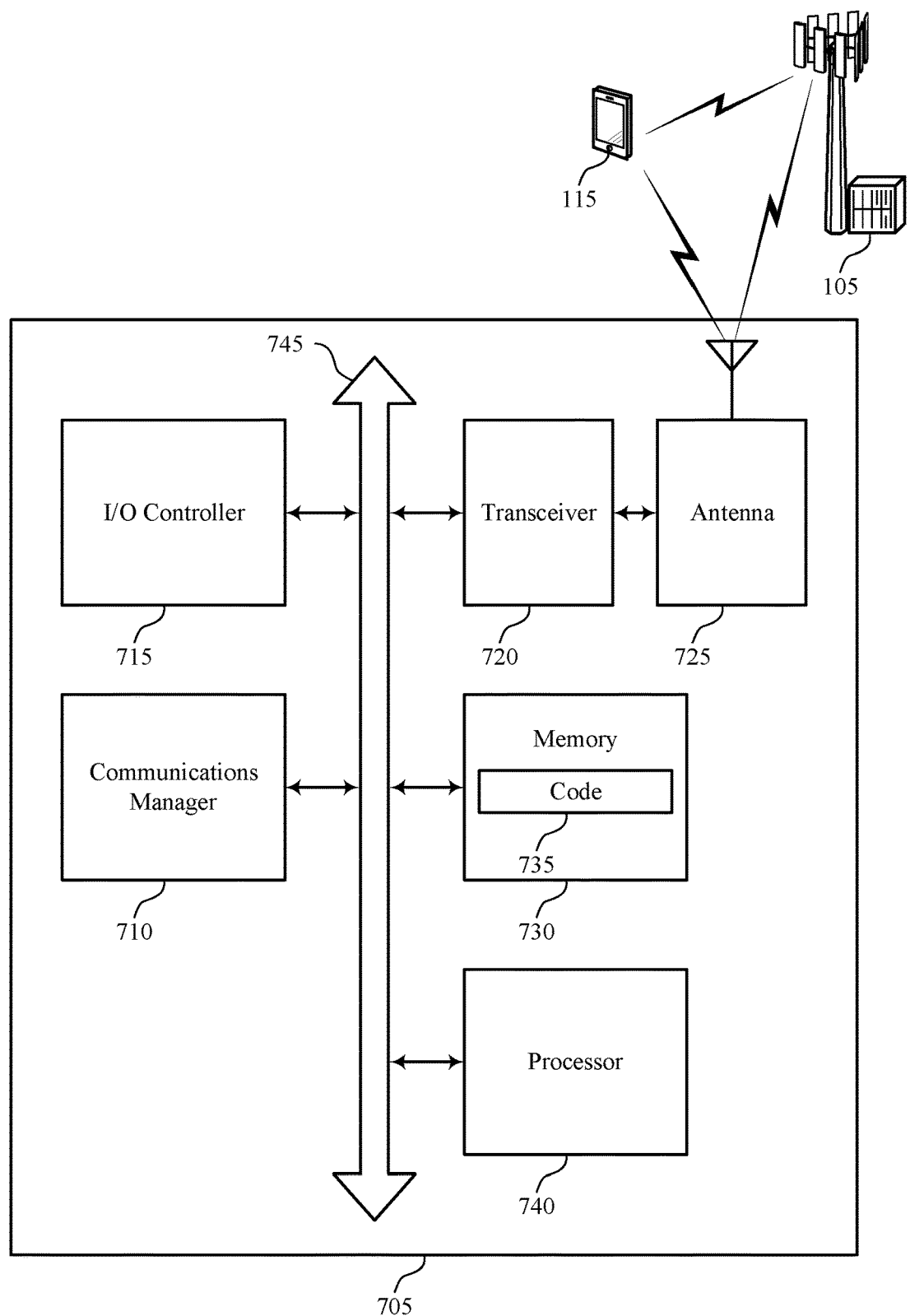
FIG. 7 shows a diagram of a system including a device that supports NACK transmissions during PHY layer issues in accordance with aspects of the present disclosure.

FIG. 7 shows a diagram of a system 700 including a device 705 that supports NACK transmissions during PHY layer issues in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communications manager 710, an I/O controller 715, a transceiver 720, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 715 may manage input and output signals for device 705. The I/O controller 715 may also manage peripherals not integrated into device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with device 705 via the I/O controller 715 or via hardware components controlled by the I/O controller 715.

In some cases, the device 705 may include a single antenna 725. However, in some cases the device may have more than one antenna 725, which may be capable of concurrently transmitting or receiving multiple wireless transmissions. The transceiver 720 may communicate bi-directionally, via the one or more antennas 725, wired, or wireless links as described herein. For example, the transceiver 720 may represent a wireless transceiver and may communicate bi-directionally with another wireless transceiver. The transceiver 720 may also include a modem to modulate the packets and provide the modulated packets to one or more antennas 725 for transmission, and to demodulate packets received from the one or more antennas 725. The transceiver 720, or the transceiver 720 and one or more antennas 725, may be an example of a transmitter 415, a transmitter 515, a receiver 410, a receiver 510, or any combination thereof or component thereof, as described herein.

The memory 730 may include random-access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting NACK transmissions during PHY layer issues).

The communications manager 710 may support wireless communications at a UE in accordance with examples as disclosed herein. For example, the communications manager 710 may be configured as or otherwise support a means for performing measurements of one or more wireless channels during a measurement gap. The communications manager 710 may be configured as or otherwise support a means for monitoring for a set of multiple packets for a downlink message following the measurement gap. The communications manager 710 may be configured as or otherwise support a means for determining that at least one packet of the set of multiple packets is unsuccessfully received at an RLC layer of the UE within a threshold amount of time following the measurement gap. The communications manager 710 may be configured as or otherwise support a means for transmitting, to a base station via the RLC layer, a NACK message prior to an expiration of a reassembly timer based on the determining.

By including or configuring the communications manager 710 in accordance with examples as described herein, the device 705 may support techniques for reduced latency and reducing strains on memory storage. For example, based on transmitting a NACK message prior to an expiration of a reassembly timer when a packet of a downlink message is determined to be unsuccessfully received at an RLC layer of the device 705, the device 705 may request a retransmission (e.g., via the NACK message) at will rather than waiting for the reassembly timer to expire to transmit the NACK message, thereby reducing latency for the device 705 to receive the full downlink message. Additionally, if the device 705 were to wait for the reassembly timer to expire before transmitting the NACK message and then also waits for the retransmission, an unnecessary burden may be placed on memory of the device 705 based on the device 705 buffering or storing any packets of the downlink message that were successfully received during an initial transmission of the downlink message. As such, by using the described fast NACK mechanism, the device 705 may buffer or store the successfully received packets for a shorter duration, thereby reducing the potential strain on the memory of the device 705.

In some examples, the communications manager 710 may be configured to perform various operations (e.g., receiving, monitoring, transmitting) using or otherwise in cooperation with the transceiver 720, the one or more antennas 725, or any combination thereof. Although the communications manager 710 is illustrated as a separate component, in some examples, one or more functions described with reference to the communications manager 710 may be supported by or performed by the processor 740, the memory 730, the code 735, or any combination thereof. For example, the code 735 may include instructions executable by the processor 740 to cause the device 705 to perform various aspects of NACK transmissions during PHY layer issues as described herein, or the processor 740 and the memory 730 may be otherwise configured to perform or support such operations.

Figure 8:
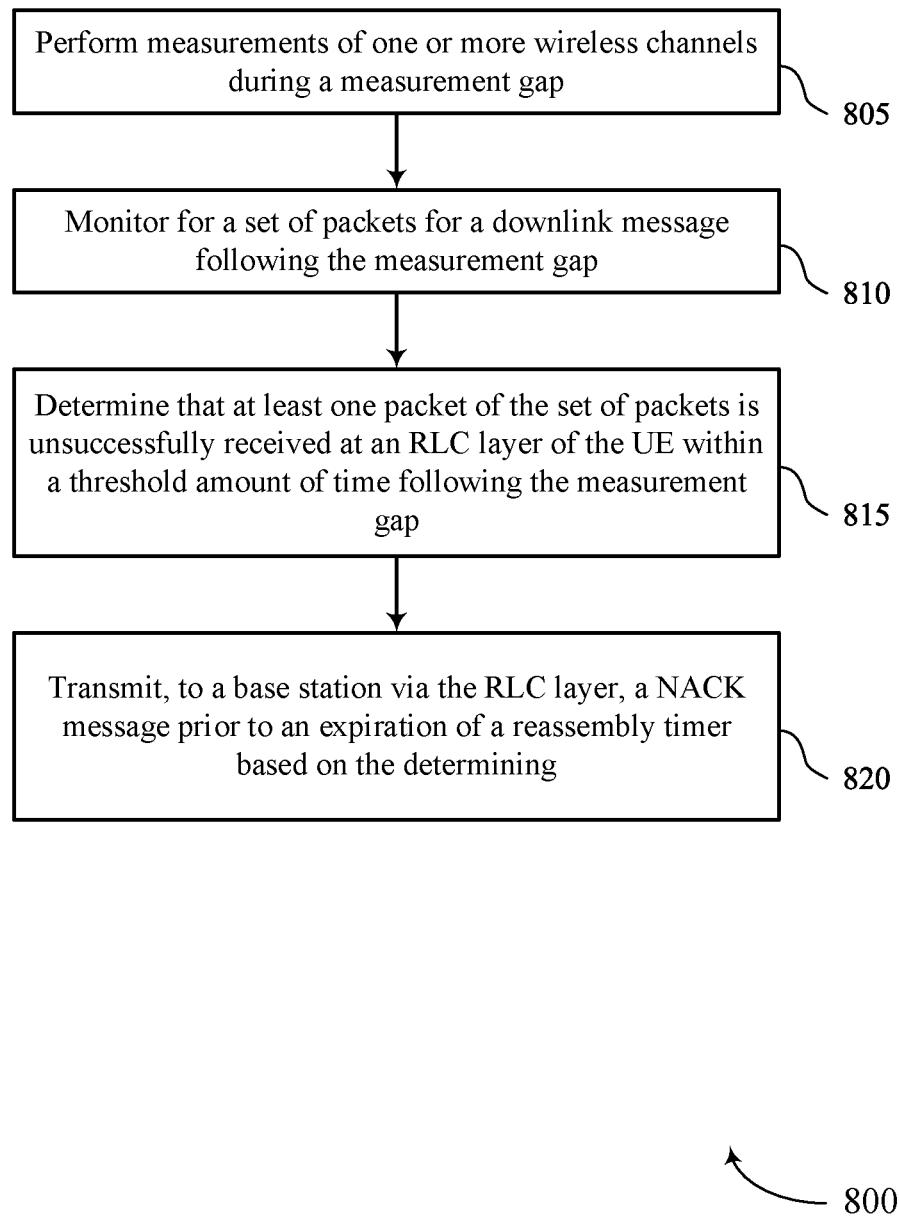
FIGS. 8 through 13 show flowcharts illustrating methods that support NACK transmissions during PHY layer issues in accordance with aspects of the present disclosure.

FIG. 8 shows a flowchart illustrating a method 800 that supports NACK transmissions during PHY layer issues in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include performing measurements of one or more wireless channels during a measurement gap. The operations of 805 may be performed according to the methods described herein. In some examples, aspects of the operations of 805 may be performed by a measurement component 625 as described with reference to FIG. 6.

At 810, the method may include monitoring for a set of multiple packets for a downlink message following the measurement gap. The operations of 810 may be performed according to the methods described herein. In some examples, aspects of the operations of 810 may be performed by a downlink message monitoring component 630 as described with reference to FIG. 6.

At 815, the method may include determining that at least one packet of the set of multiple packets is unsuccessfully received at an RLC layer of the UE within a threshold amount of time following the measurement gap. The operations of 815 may be performed according to the methods described herein. In some examples, aspects of the operations of 815 may be performed by a packet reception determination component 635 as described with reference to FIG. 6.

At 820, the method may include transmitting, to a base station via the RLC layer, a NACK message prior to an expiration of a reassembly timer based on the determining. The operations of 820 may be performed according to the methods described herein. In some examples, aspects of the operations of 820 may be performed by a fast NACK component 640 as described with reference to FIG. 6.

Figure 9:
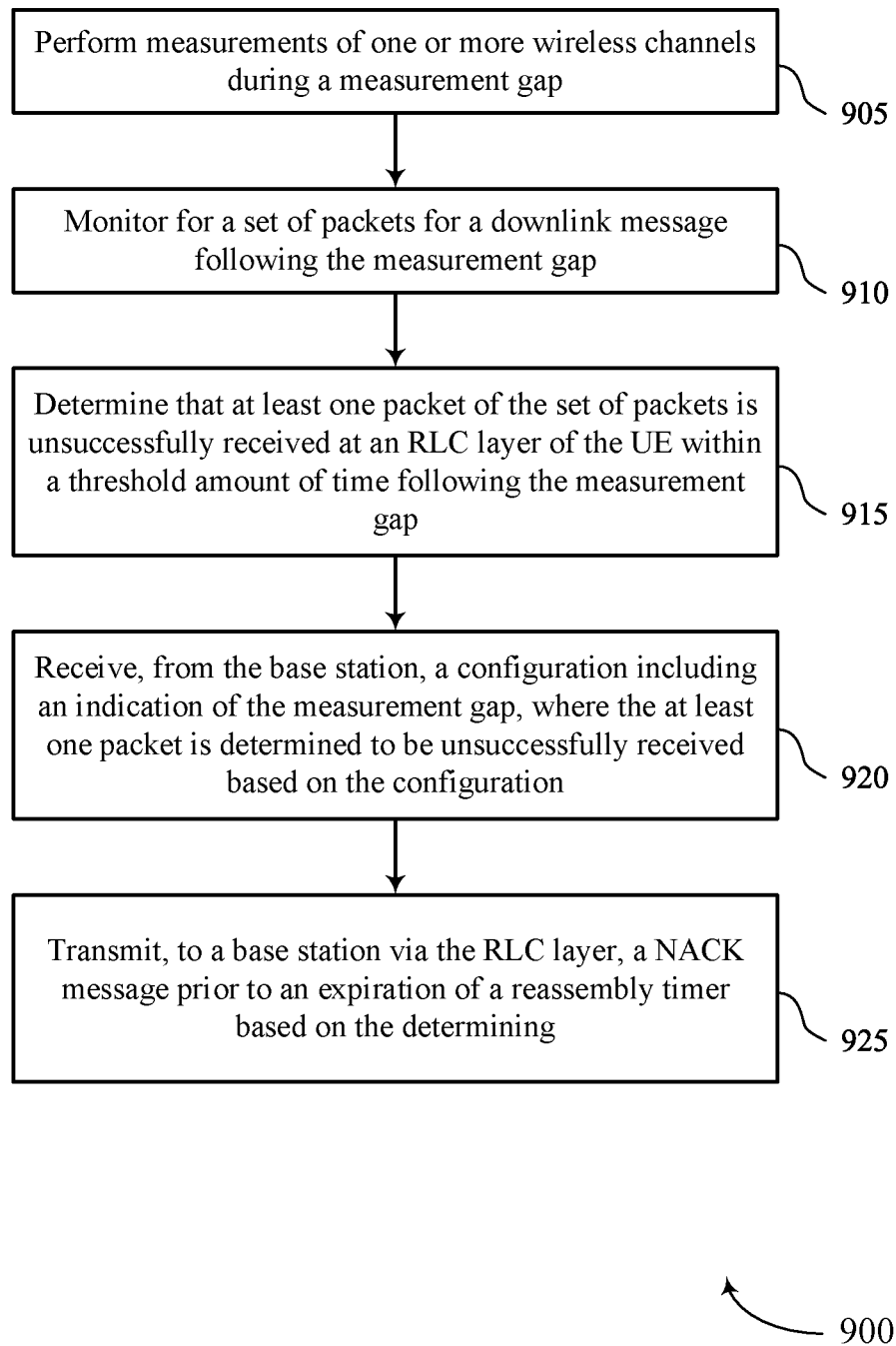

FIG. 9 shows a flowchart illustrating a method 900 that supports NACK transmissions during PHY layer issues in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include performing measurements of one or more wireless channels during a measurement gap. The operations of 905 may be performed according to the methods described herein. In some examples, aspects of the operations of 905 may be performed by a measurement component 625 as described with reference to FIG. 6.

At 910, the method may include monitoring for a set of multiple packets for a downlink message following the measurement gap. The operations of 910 may be performed according to the methods described herein. In some examples, aspects of the operations of 910 may be performed by a downlink message monitoring component 630 as described with reference to FIG. 6.

At 915, the method may include determining that at least one packet of the set of multiple packets is unsuccessfully received at an RLC layer of the UE within a threshold amount of time following the measurement gap. The operations of 915 may be performed according to the methods described herein. In some examples, aspects of the operations of 915 may be performed by a packet reception determination component 635 as described with reference to FIG. 6.

At 920, the method may include receiving, from the base station, a configuration including an indication of the measurement gap, where the at least one packet is determined to be unsuccessfully received based on the configuration. The operations of 920 may be performed according to the methods described herein. In some examples, aspects of the operations of 920 may be performed by a measurement gap component 645 as described with reference to FIG. 6.

At 925, the method may include transmitting, to a base station via the RLC layer, a NACK message prior to an expiration of a reassembly timer based on the determining. The operations of 925 may be performed according to the methods described herein. In some examples, aspects of the operations of 925 may be performed by a fast NACK component 640 as described with reference to FIG. 6.

Figure 10:
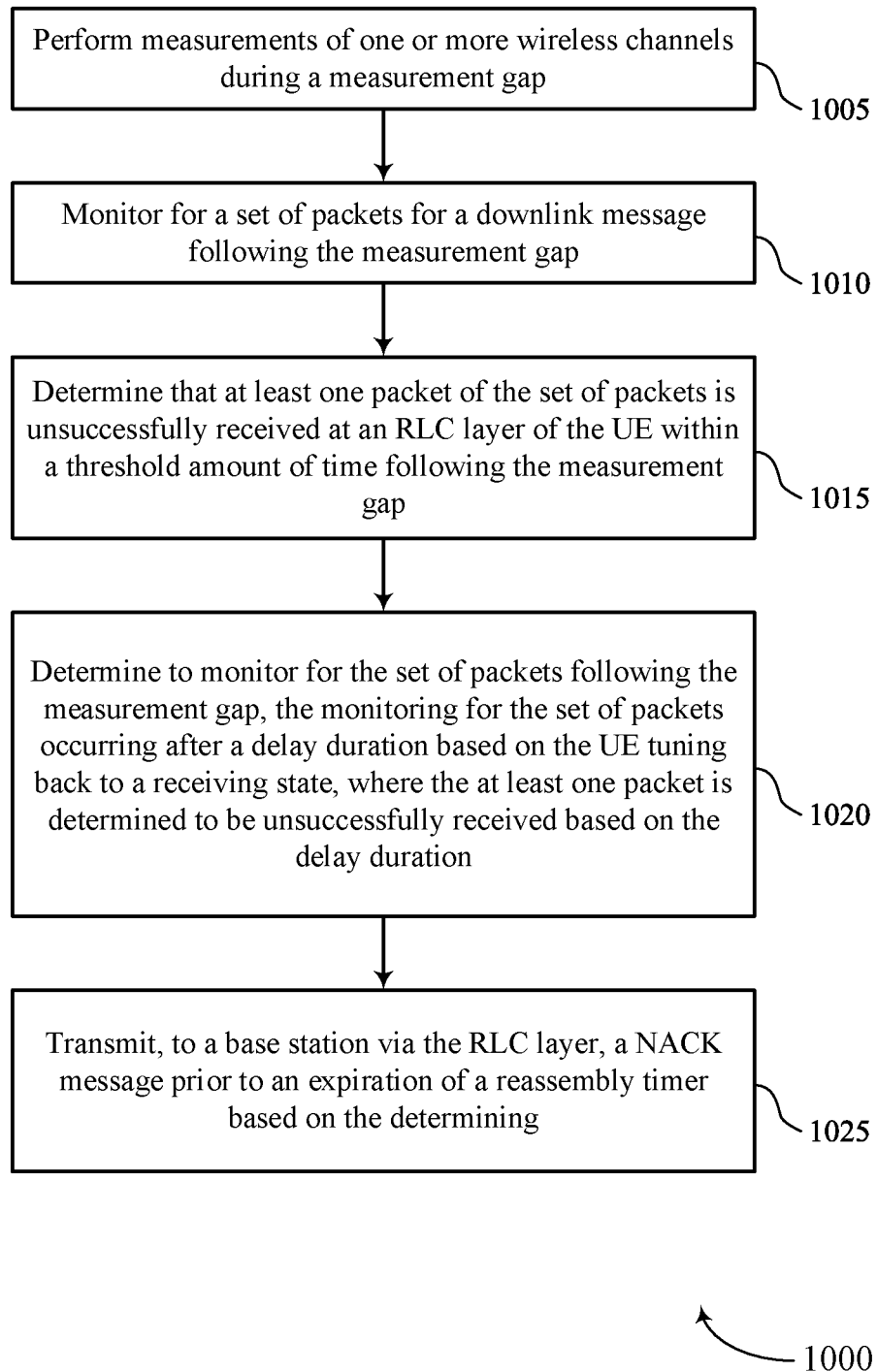

FIG. 10 shows a flowchart illustrating a method 1000 that supports NACK transmissions during PHY layer issues in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include performing measurements of one or more wireless channels during a measurement gap. The operations of 1005 may be performed according to the methods described herein. In some examples, aspects of the operations of 1005 may be performed by a measurement component 625 as described with reference to FIG. 6.

At 1010, the method may include monitoring for a set of multiple packets for a downlink message following the measurement gap. The operations of 1010 may be performed according to the methods described herein. In some examples, aspects of the operations of 1010 may be performed by a downlink message monitoring component 630 as described with reference to FIG. 6.

At 1015, the method may include determining that at least one packet of the set of multiple packets is unsuccessfully received at an RLC layer of the UE within a threshold amount of time following the measurement gap. The operations of 1015 may be performed according to the methods described herein. In some examples, aspects of the operations of 1015 may be performed by a packet reception determination component 635 as described with reference to FIG. 6.

At 1020, the method may include determining to monitor for the set of multiple packets following the measurement gap, the monitoring for the set of multiple packets occurring after a delay duration based on the UE tuning back to a receiving state, where the at least one packet is determined to be unsuccessfully received based on the delay duration. The operations of 1020 may be performed according to the methods described herein. In some examples, aspects of the operations of 1020 may be performed by a tuning delay component 650 as described with reference to FIG. 6.

At 1025, the method may include transmitting, to a base station via the RLC layer, a NACK message prior to an expiration of a reassembly timer based on the determining. The operations of 1025 may be performed according to the methods described herein. In some examples, aspects of the operations of 1025 may be performed by a fast NACK component 640 as described with reference to FIG. 6.

Figure 11:
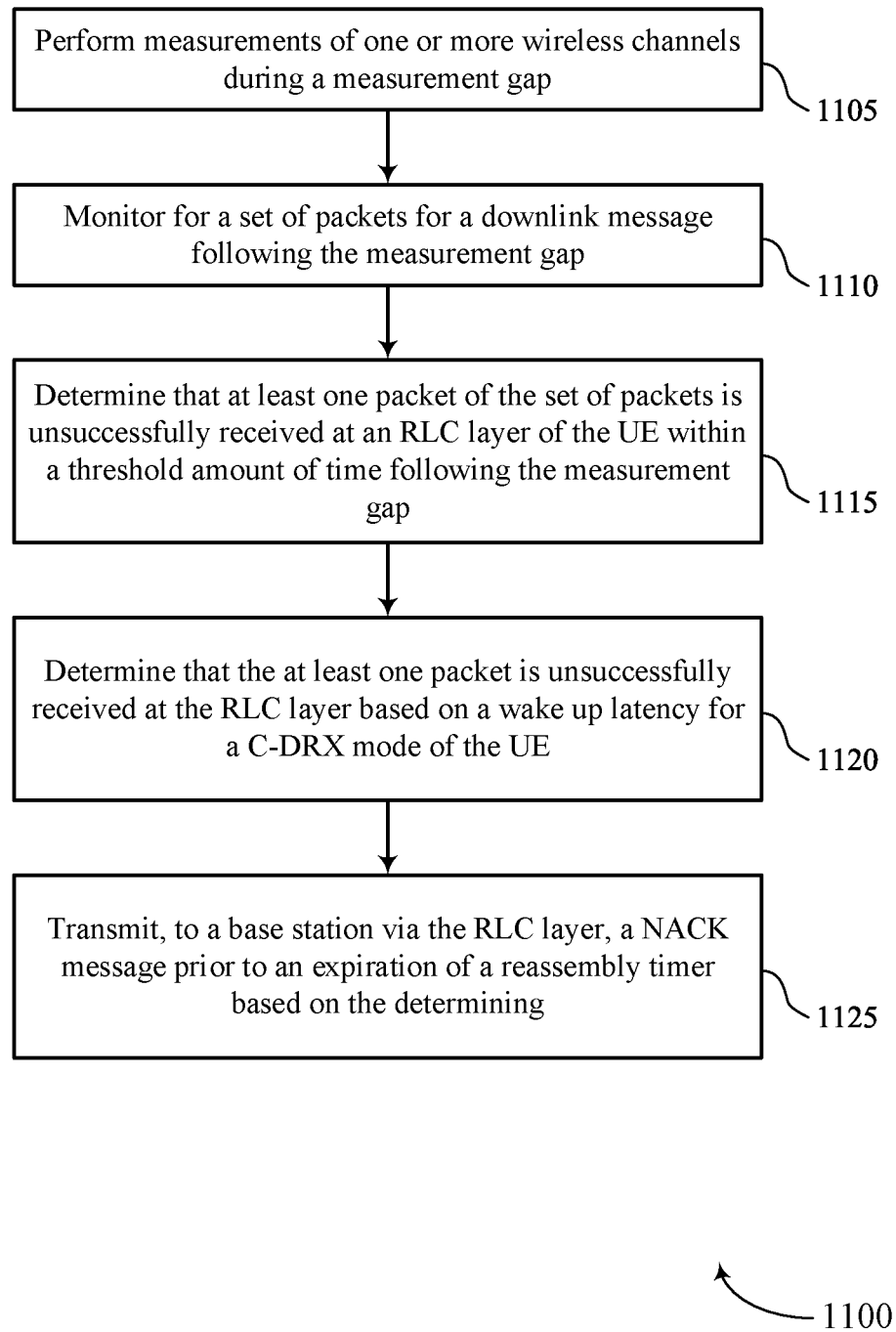

FIG. 11 shows a flowchart illustrating a method 1100 that supports NACK transmissions during PHY layer issues in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1105, the method may include performing measurements of one or more wireless channels during a measurement gap. The operations of 1105 may be performed according to the methods described herein. In some examples, aspects of the operations of 1105 may be performed by a measurement component 625 as described with reference to FIG. 6.

At 1110, the method may include monitoring for a set of multiple packets for a downlink message following the measurement gap. The operations of 1110 may be performed according to the methods described herein. In some examples, aspects of the operations of 1110 may be performed by a downlink message monitoring component 630 as described with reference to FIG. 6.

At 1115, the method may include determining that at least one packet of the set of multiple packets is unsuccessfully received at an RLC layer of the UE within a threshold amount of time following the measurement gap. The operations of 1115 may be performed according to the methods described herein. In some examples, aspects of the operations of 1115 may be performed by a packet reception determination component 635 as described with reference to FIG. 6.

At 1120, the method may include determining that the at least one packet is unsuccessfully received at the RLC layer based on a wake up latency for a C-DRX mode of the UE. The operations of 1120 may be performed according to the methods described herein. In some examples, aspects of the operations of 1120 may be performed by a wake up latency component 655 as described with reference to FIG. 6.

At 1125, the method may include transmitting, to a base station via the RLC layer, a NACK message prior to an expiration of a reassembly timer based on the determining. The operations of 1125 may be performed according to the methods described herein. In some examples, aspects of the operations of 1125 may be performed by a fast NACK component 640 as described with reference to FIG. 6.

Figure 12:
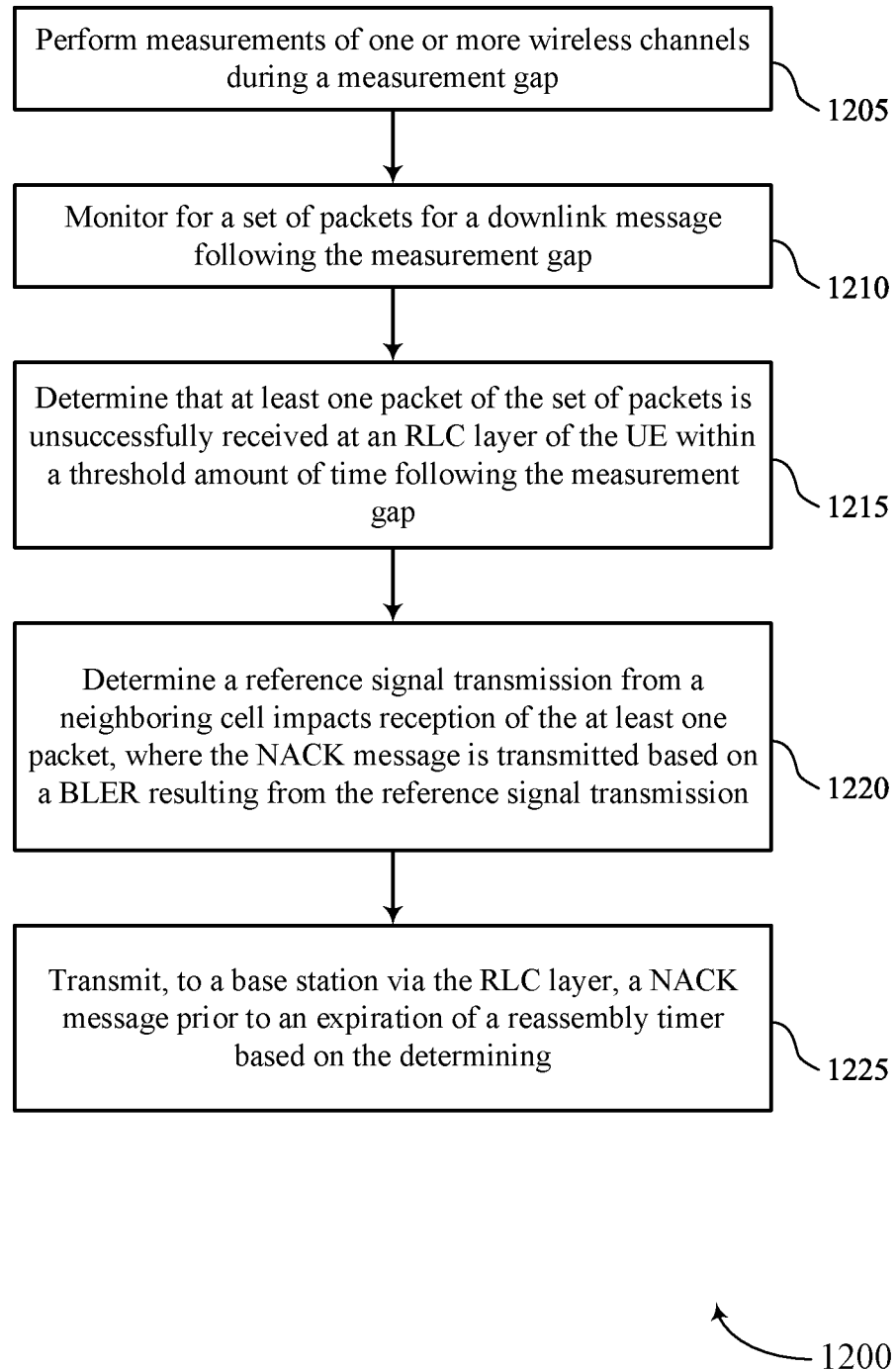

FIG. 12 shows a flowchart illustrating a method 1200 that supports NACK transmissions during PHY layer issues in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include performing measurements of one or more wireless channels during a measurement gap. The operations of 1205 may be performed according to the methods described herein. In some examples, aspects of the operations of 1205 may be performed by a measurement component 625 as described with reference to FIG. 6.

At 1210, the method may include monitoring for a set of multiple packets for a downlink message following the measurement gap. The operations of 1210 may be performed according to the methods described herein. In some examples, aspects of the operations of 1210 may be performed by a downlink message monitoring component 630 as described with reference to FIG. 6.

At 1215, the method may include determining that at least one packet of the set of multiple packets is unsuccessfully received at an RLC layer of the UE within a threshold amount of time following the measurement gap. The operations of 1215 may be performed according to the methods described herein. In some examples, aspects of the operations of 1215 may be performed by a packet reception determination component 635 as described with reference to FIG. 6.

At 1220, the method may include determining a reference signal transmission from a neighboring cell impacts reception of the at least one packet, where the NACK message is transmitted based on a BLER resulting from the reference signal transmission. The operations of 1220 may be performed according to the methods described herein. In some examples, aspects of the operations of 1220 may be performed by a BLER trigger component 660 as described with reference to FIG. 6.

At 1225, the method may include transmitting, to a base station via the RLC layer, a NACK message prior to an expiration of a reassembly timer based on the determining. The operations of 1225 may be performed according to the methods described herein. In some examples, aspects of the operations of 1225 may be performed by a fast NACK component 640 as described with reference to FIG. 6.

Figure 13:
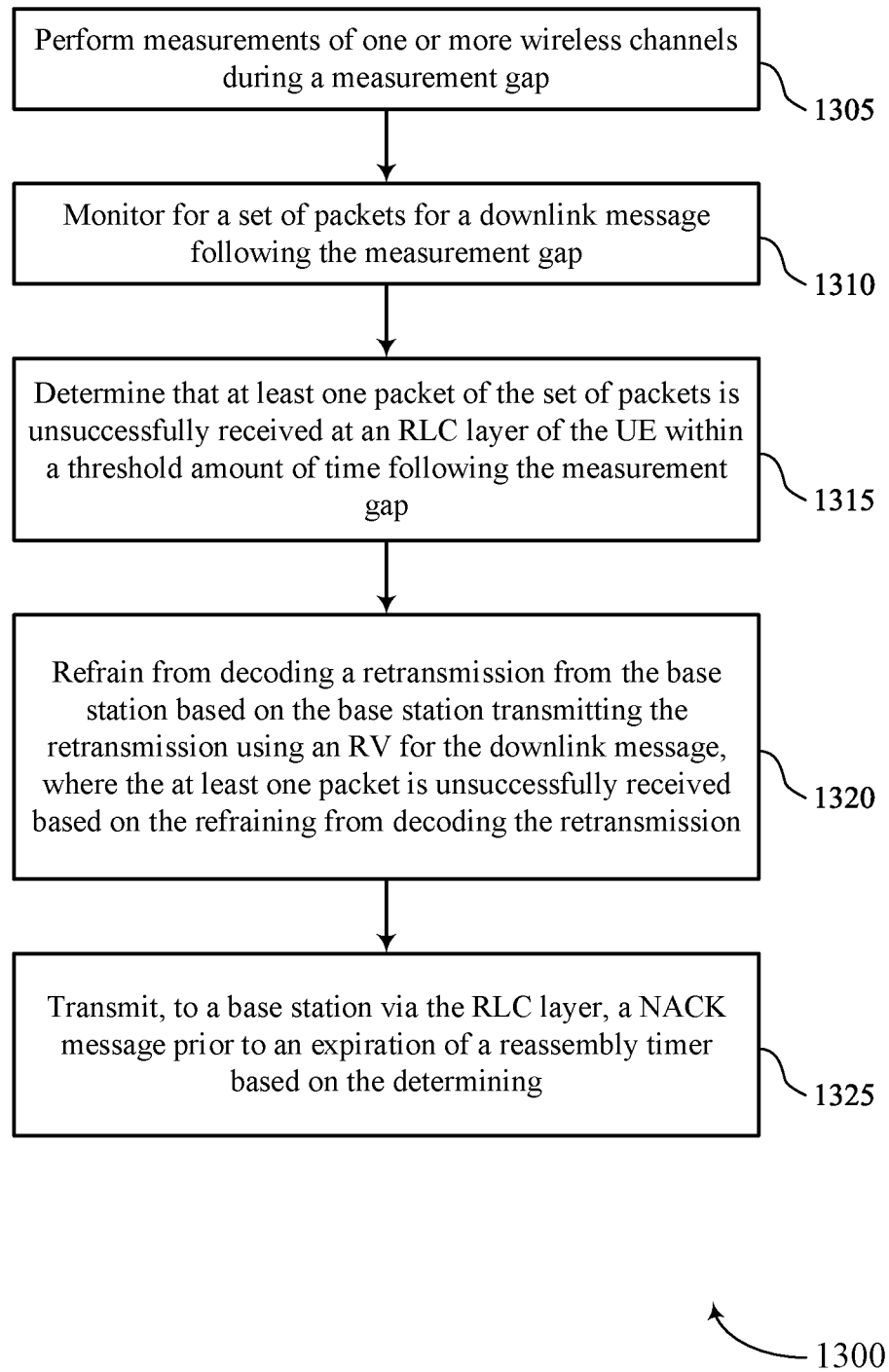

FIG. 13 shows a flowchart illustrating a method 1300 that supports NACK transmissions during PHY layer issues in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include performing measurements of one or more wireless channels during a measurement gap. The operations of 1305 may be performed according to the methods described herein. In some examples, aspects of the operations of 1305 may be performed by a measurement component 625 as described with reference to FIG. 6.

At 1310, the method may include monitoring for a set of multiple packets for a downlink message following the measurement gap. The operations of 1310 may be performed according to the methods described herein. In some examples, aspects of the operations of 1310 may be performed by a downlink message monitoring component 630 as described with reference to FIG. 6.

At 1315, the method may include determining that at least one packet of the set of multiple packets is unsuccessfully received at an RLC layer of the UE within a threshold amount of time following the measurement gap. The operations of 1315 may be performed according to the methods described herein. In some examples, aspects of the operations of 1315 may be performed by a packet reception determination component 635 as described with reference to FIG. 6.

At 1320, the method may include refraining from decoding a retransmission from the base station based on the base station transmitting the retransmission using an RV for the downlink message, where the at least one packet is unsuccessfully received based on the refraining from decoding the retransmission. The operations of 1320 may be performed according to the methods described herein. In some examples, aspects of the operations of 1320 may be performed by an RV trigger component 665 as described with reference to FIG. 6.

At 1325, the method may include transmitting, to a base station via the RLC layer, a NACK message prior to an expiration of a reassembly timer based on the determining. The operations of 1325 may be performed according to the methods described herein. In some examples, aspects of the operations of 1325 may be performed by a fast NACK component 640 as described with reference to FIG. 6.

The following provides an overview of aspects of the present disclosure:

Aspect 1: A method for wireless communications at a UE, comprising: performing measurements of one or more wireless channels during a measurement gap; monitoring for a plurality of packets for a downlink message following the measurement gap; determining that at least one packet of the plurality of packets is unsuccessfully received at a radio link control layer of the UE within a threshold amount of time following the measurement gap; and transmitting, to a base station via the radio link control layer, a negative acknowledgment message prior to an expiration of a reassembly timer based at least in part on the determining.

Aspect 2: The method of aspect 1, further comprising: receiving, from the base station, a configuration comprising an indication of the measurement gap, wherein the at least one packet is determined to be unsuccessfully received based at least in part on the configuration.

Aspect 3: The method of aspect 2, wherein the configuration comprises network scheduling for at least the measurement gap, timing between the base station and the UE, or a combination thereof.

Aspect 4: The method of any of aspects 1 through 3, further comprising: determining to monitor for the plurality of packets following the measurement gap, the monitoring for the plurality of packets occurring after a delay duration based at least in part on the UE tuning back to a receiving state, wherein the at least one packet is determined to be unsuccessfully received based at least in part on the delay duration.

Aspect 5: The method of any of aspects 1 through 4, wherein determining that the at least one packet is unsuccessfully received at the radio link control layer comprises: determining that the at least one packet is unsuccessfully received at the radio link control layer based at least in part on a wake up latency for a connected discontinuous reception mode of the UE.

Aspect 6: The method of aspect 5, further comprising: determining at least one hybrid automatic repeat request transmission fails comprising a transmission parameter, wherein the at least one packet is determined to be unsuccessfully received based at least in part on the at least one hybrid access request transmission comprising the transmission parameter failed.

Aspect 7: The method of aspect 6, wherein the transmission parameter comprises a modulation and coding scheme.

Aspect 8: The method of any of aspects 1 through 7, wherein determining that the at least one packet is unsuccessfully received at the radio link control layer comprises: determining a reference signal transmission from a neighboring cell impacts reception of the at least one packet, wherein the negative acknowledgment message is transmitted based at least in part on a block error rate resulting from the reference signal transmission.

Aspect 9: The method of aspect 8, wherein the reference signal transmission comprises a tracking reference signal channel state information reference signal or a non-zero power channel state information reference signal.

Aspect 10: The method of any of aspects 1 through 9, wherein determining that the at least one packet is unsuccessfully received at the radio link control layer comprises: refraining from decoding a retransmission from the base station based at least in part on the base station transmitting the retransmission using a redundancy version for the downlink message, wherein the at least one packet is unsuccessfully received based at least in part on the refraining from decoding the retransmission.

Aspect 11: The method of any of aspects 1 through 10, further comprising: receiving, from the base station, a retransmission of the at least one packet based at least in part on transmitting the negative acknowledgment message.

Aspect 12: An apparatus for wireless communications at a UE, comprising a processor; memory coupled with the processor; and instructions stored in the memory and executable by the processor to cause the apparatus to perform a method of any of aspects 1 through 11.

Aspect 13: An apparatus for wireless communications at a UE, comprising at least one means for performing a method of any of aspects 1 through 11.

Aspect 14: A non-transitory computer-readable medium storing code for wireless communications at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor; and
memory coupled with the processor, wherein the processor is configured to cause the apparatus to:
receive, from a base station, a configuration comprising an indication of a measurement gap;
perform measurements of one or more wireless channels during the measurement gap;
monitor for a plurality of packets for a downlink message following the measurement gap;
determine, based at least in part on the configuration, that at least one packet of the plurality of packets is unsuccessfully received at a radio link control layer of the apparatus within a threshold amount of time following the measurement gap; and
transmit, to the base station via the radio link control layer, a negative acknowledgment message prior to an expiration of a reassembly timer based at least in part on the determination.

2. The apparatus of claim 1, wherein the configuration comprises network scheduling for at least the measurement gap, timing between the base station and the apparatus, or a combination thereof.

3. The apparatus of claim 1, wherein the processor is configured to cause the apparatus to:
tune back to a receiving state; and
determine to monitor for the plurality of packets following the measurement gap after a delay duration based at least in part on the apparatus having tuned back to the receiving state, wherein, to determine that at least one packet of the plurality of packets is unsuccessfully received at the radio link control layer, the processor is configured to cause the apparatus to determine that the at least one packet is unsuccessfully received at the radio link control layer based at least in part on the delay duration.

4. The apparatus of claim 1, wherein, to determine that the at least one packet is unsuccessfully received at the radio link control layer, the processor is configured to cause the apparatus to determine that the at least one packet is unsuccessfully received at the radio link control layer based at least in part on a wake up latency for a connected discontinuous reception mode of the apparatus.

5. The apparatus of claim 4, wherein the processor is configured to cause the apparatus to:
determine at least one hybrid automatic repeat request transmission fails comprising a transmission parameter, wherein, to determine that the at least one packet is unsuccessfully received at the radio link control layer, the processor is configured to cause the apparatus to determine that the at least one packet is unsuccessfully received at the radio link control layer based at least in part on the failure of the at least one hybrid automatic repeat request transmission comprising the transmission parameter.

6. The apparatus of claim 5, wherein the transmission parameter comprises a modulation and coding scheme.

7. The apparatus of claim 1, wherein, to determine that the at least one packet is unsuccessfully received at the radio link control layer, the processor is configured to cause the processor to:
determine a reference signal transmission from a neighboring cell impacts reception of the at least one packet, wherein, to transmit the negative acknowledgment message, the processor is configured to cause the apparatus to transmit the negative acknowledgement message based at least in part on a block error rate resulting from the reference signal transmission.

8. The apparatus of claim 7, wherein the reference signal transmission comprises a tracking reference signal channel state information reference signal or a non-zero power channel state information reference signal.

9. The apparatus of claim 1, wherein the processor is configured to cause the apparatus to:
refrain from decoding a retransmission from the base station based at least in part on the retransmission using a redundancy version for the downlink message, wherein, to determine that the at least one packet is unsuccessfully received at the radio link control layer, the processor is configured to cause the apparatus to determine that the at least one packet is unsuccessfully received at the radio link control layer based at least in part on the refrainment to decode the retransmission.

10. The apparatus of claim 1, wherein the processor is configured to cause the apparatus to:
receive, from the base station, a retransmission of the at least one packet based at least in part on transmission of the negative acknowledgment message.

11. An apparatus for wireless communication, comprising:
a processor; and
memory coupled with the processor, wherein the processor is configured to cause the apparatus to:
perform measurements of one or more wireless channels during a measurement gap;
monitor for a plurality of packets for a downlink message following the measurement gap;
transmit, to the base station via a radio link control layer of the apparatus, a negative acknowledgment message prior to an expiration of a reassembly timer based at least in part on unsuccessful receipt of at least one packet of the plurality of packets at the radio link control layer within a threshold amount of time following the measurement gap; and
refrain from decoding a retransmission from the base station based at least in part on the retransmission using a redundancy version for the downlink message.

12. The apparatus of claim 11, wherein the processor is configured to cause the apparatus to:
determine a reference signal transmission from a neighboring cell impacts reception of the at least one packet, wherein, to transmit the negative acknowledgment message, the processor is configured to cause the apparatus to transmit the negative acknowledgement message based at least in part on a block error rate resulting from the reference signal transmission.

13. The apparatus of claim 12, wherein the reference signal transmission comprises a tracking reference signal channel state information reference signal.

14. The apparatus of claim 12, wherein the reference signal transmission comprises a non-zero power channel state information reference signal.

15. An apparatus for wireless communication, comprising:
- a processor; and
- memory coupled with the processor, wherein the processor is configured to cause the apparatus to:
  - monitor for a plurality of packets for a downlink message following a measurement gap;
  - determine, based at least in part on failure of at least one hybrid automatic repeat request transmission comprising a modulation and coding scheme, that at least one packet of the plurality of packets is unsuccessfully received at a radio link control layer of the apparatus within a threshold amount of time following the measurement gap; and
  - transmit, to a base station via the radio link control layer, a negative acknowledgment message prior to an expiration of a reassembly timer based at least in part on the determination.

16. An apparatus for wireless communication, comprising:
- a processor, and memory coupled with the processor, wherein the processor is configured to cause the apparatus to:
  - monitor for a plurality of packets for a downlink message following a measurement gap;
  - determine, based at least in part on a reference signal transmission from a neighboring cell impacts reception of the at least one packet, that at least one packet of the plurality of packets is unsuccessfully received at a radio link control layer of the apparatus within a threshold amount of time following the measurement gap; and
  - transmit, to a base station via the radio link control layer, a negative acknowledgment message prior to an expiration of a reassembly timer based at least in part on the determination and a block error rate resulting from the reference signal transmission.

17. The apparatus of claim 16, wherein the reference signal transmission comprises a tracking reference signal channel state information reference signal.

18. The apparatus of claim 16, wherein the reference signal transmission comprises a non-zero power channel state information reference signal.

\* \* \* \* \*